US009276806B2

(12) United States Patent
Cartmell et al.

(10) Patent No.: US 9,276,806 B2
(45) Date of Patent: Mar. 1, 2016

(54) FAILOVER RECOVERY METHODS WITH AN EDGE COMPONENT

(71) Applicant: INTERDIGITAL PATENT HOLDINGS, INC., Wilmington, DE (US)

(72) Inventors: John Cartmell, North Massapequa, NY (US); Khasim Shaheed, Bangalore (IN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/054,228

(22) Filed: Oct. 15, 2013

(65) Prior Publication Data

US 2014/0177434 A1    Jun. 26, 2014

Related U.S. Application Data

(60) Provisional application No. 61/713,953, filed on Oct. 15, 2012.

(51) Int. Cl.
*H04L 12/24* (2006.01)
*H04L 12/713* (2013.01)
*H04L 29/06* (2006.01)
*H04W 12/02* (2009.01)
*H04W 76/02* (2009.01)
(Continued)

(52) U.S. Cl.
CPC ........ *H04L 41/0668* (2013.01); *H04L 41/0654* (2013.01); *H04L 45/586* (2013.01); *H04L 63/164* (2013.01); *H04L 69/40* (2013.01); *H04W 12/02* (2013.01); *H04W 76/02* (2013.01); *H04L 43/10* (2013.01)

(58) Field of Classification Search
CPC ............ H04L 41/0668; H04L 41/0654; H04L 63/164; H04W 76/02; H04W 76/027
See application file for complete search history.

(56) References Cited

U.S. PATENT DOCUMENTS 8,041,335 B2 * 10/2011 Khetawat et al. .......... 455/404.2
8,489,685 B2 *  7/2013 Bharadhwaj et al. ......... 709/205
(Continued)

FOREIGN PATENT DOCUMENTS

WO    WO 2011/022613 A1    2/2011

OTHER PUBLICATIONS

3rd Generation Partnership Project (3GPP), TR 29.839 V1.0.0, "Technical Report Group Core Network and Terminals, 3GPP System-Fixed Broadband Access Network Interworking, Home (e)Node B-Security Gateway Interface (Release 11)", Jun. 2012, pp. 1-12.
3rd Generation Partnership Project (3GPP), TS 33.320 V11.6.0, "Technical Specification Group Services and System Aspects, Security of Home Node B (HNB) / Home Evolved Node B (HeNB) (Release 11 )", Jun. 2012, pp. 1-41.

(Continued)

*Primary Examiner* — Min Jung
(74) *Attorney, Agent, or Firm* — Condo Roccia Koptiw LLP

(57) ABSTRACT

Systems and/or methods may be used to handle failure of a HeNB/HNB, a SeGW, or an edge component. For example, actions may be performed by the edge component when a HeNB, a CGW, or a SeGW fails. The actions that may be performed when a SeGW may fail may include tearing down an IPSec tunnel to a HeNB connected to the edge component, using S1-AP signaling, a signaling interface (e.g., a connection management interface (CMI), an X2 interface, and/or a $S_{xx}$ interface to inform the HeNB of the failure, and/or the like. The actions that may be performed when a HeNB may fail may include using S1-AP signaling and/or a signaling interface (e.g., a CMI) to inform a mobility management entity (MME) of the failure, and/or the like.

32 Claims, 19 Drawing Sheets

(51) Int. Cl.
*H04L 29/14* (2006.01)
*H04L 12/26* (2006.01)

(56) References Cited

U.S. PATENT DOCUMENTS

| | | | |
|---|---|---|---|
| 2006/0041742 A1* | 2/2006 | Oba | 713/151 |
| 2007/0178905 A1* | 8/2007 | El Mghazli et al. | 455/445 |
| 2008/0155677 A1* | 6/2008 | Hossain et al. | 726/15 |
| 2010/0199332 A1* | 8/2010 | Bachmann et al. | 726/4 |
| 2012/0204252 A1* | 8/2012 | Silver | 726/12 |
| 2012/0207013 A1* | 8/2012 | Kamalaraj et al. | 370/218 |
| 2013/0044608 A1* | 2/2013 | Qiang et al. | 370/242 |
| 2013/0194911 A1* | 8/2013 | Fedyk et al. | 370/217 |
| 2013/0258839 A1* | 10/2013 | Wang et al. | 370/221 |
| 2014/0235261 A1* | 8/2014 | Fan et al. | 455/452.1 |

OTHER PUBLICATIONS

3rd Generation Partnership Project 2 (3GPP 2), 3GPP2, X.S0059-100-0, "Cdma2000 Femtocell Network: Packet Data Network Aspects", Jan. 2010, 57 pages.

3rd Generation Partnership Project (3GPP), TR 32.593 v10.0.0, "Home eNode B (HeNB) Operations, Administration, Maintenance and Provisioning (OAM&P); Procedure Flows for Type 1 Interface HeNB to HeNB Management System (Release 10)", Jun. 2010, pp. 1-20.

Cisco, "IPSec Dead Peer Detection Periodic Message Option," American Headquarters: Cisco Systems, Inc., San Jose, CA, May 1, 2004, pp. 1-16.

* cited by examiner

FAILOVER RECOVERY METHODS WITH AN EDGE COMPONENT

CROSS-REFERENCE TO RELATED APPLICATIONS

This application claims the benefit of U.S. Provisional Patent Application No. 61/713,953, filed Oct. 15, 2012, the contents of which are hereby incorporated by reference herein.

BACKGROUND

Today, there may be one or more components such as an edge component that may be located between networks such as a local home network and the internet. The edge component may interface with and/or may act as an intermediary between one or more components in the local home network, one or more components in communication with the public internet, and/or one or more components in a wireless communication network (e.g., a core network) such as a cellular communication network. In examples, the edge component may facilitate security amongst such network, may balance loads between the components of the networks, may provide network connectivity, and/or the like.

For example, an edge component that may be located at the edge of local home network and the public internet may be in communication with a component such as a Home eNodeB (HeNB), HNB, and/or the like in the local home network and a component such as secure gateway (SeGW), mobility management entity (MME), packet data network (PDN) component, and/or the like in a core network (or EPC) such that the edge component may act as an intermediary between such components. Such an edge component may provide and/or enable the component in the local home network to be connected to the wireless communication network and one or more components network therein (e.g., the edge component may enable network connectivity between the components of the local home network and the wireless communication network). Unfortunately, the edge component, one or more components such as the HeNB, HNB, and/or the like of the local home network, and/or one or more components such as a SeGW, MME, PDN, and/or the like may fail such that network connectivity may be lost. Currently, there may not be sufficient methods, techniques, and/or procedures to handle a failure thereby preventing a loss in network connectivity and/or providing a robust network.

SUMMARY

Systems and/or methods may be provided to handle failure of a HeNB/HNB, a SeGW, or an edge component such as a converged gateway (CGW). This may be done, for example, to enable failover recovery for a CGW. For example, actions may be performed by the edge component, HeNB, SeGW, MME, and/or the when a HeNB, an edge component, and/or a SeGW fails. In an example, messages and/or interfaces may be provided and used with these actions.

For example, a system and/or method for handling a failure of a secure gateway (SeGW) may be provided. In an example, a first connection to a first SeGW in a core network and a second connection to a home eNode-B (HeNB) in a local home network may be established with an edge component. The HeNB may be connected to one or more components in the core network via the first SeGW and the edge component. The edge component may determine whether the first SeGW may have failed. The edge component may establish a third connection to a second SeGW, for example, in response to determining that the first SeGW may have failed. The edge component may inform the HeNB that the first SeGW may have failed, for example, to enable the HeNB to reconnect to the one or more components in the core network via the second SeGW and the edge component. In an example, the edge component may inform the HeNB that the first SeGW may have failed by performing at least one of the following: tearing down an IP security tunnel established via the second connection to the HeNB; sending or transmitting a reset message to the HeNB indicating to the HeNB to restart an S1-AP interface; sending or transmitting a message via SCTP over a connection management interface (CMI); sending or transmitting a message via an X2 interface; sending or transmitting a message via an Sxx interface; and/or the like.

Further, a system and/or method for handling a failure of a HeNB may be provided. For example, a first connection to a secure gateway (SeGW) in a core network and a second connection to the HeNB in a local home network may be established with an edge component. The HeNB may be connected to a mobility management entity (MME) in the core network via the SeGW and the edge component. The edge component may determine that the HeNB may have failed and (e.g., in response to such a determination) may inform the MME in the core network via the edge component and the SeGW that the HeNB may have failed to enable the MME to remove information (e.g., 51 context information) associated with the HeNB that has failed. In an example the edge component may inform the MME that the HeNB may have failed by performing one or more of the following: sending or transmitting a S1-AP reset message to the MME via the SeGW; sending or transmitting a message to the MME over a connection management interface (CMI) instructing the MME to clean up an S1-AP session with the HeNB; and/or the like.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Disclosed herein may be methods and/or systems that may be used to handle failure of components of a local home network, components of a wireless communication network such as the network 100 described in FIGS. 1A and 1C-1E including, for example, a HeNB/HNB, a SeGW, or an edge component such as a converged gateway (CGW) and/or local gateway (LGW). This may be done, for example, to enable failover recovery for one or more of the components. For example, actions may be performed by the edge component when a HeNB, an edge component, and/or a SeGW may fail. Messages and interfaces that may be used for these actions may be disclosed herein.

A detailed description of illustrative embodiments may now be described with reference to the various Figures. Although this description provides a detailed example of possible implementations, it should be noted that the details are intended to be exemplary and in no way limit the scope of the application.

Figure 1A:
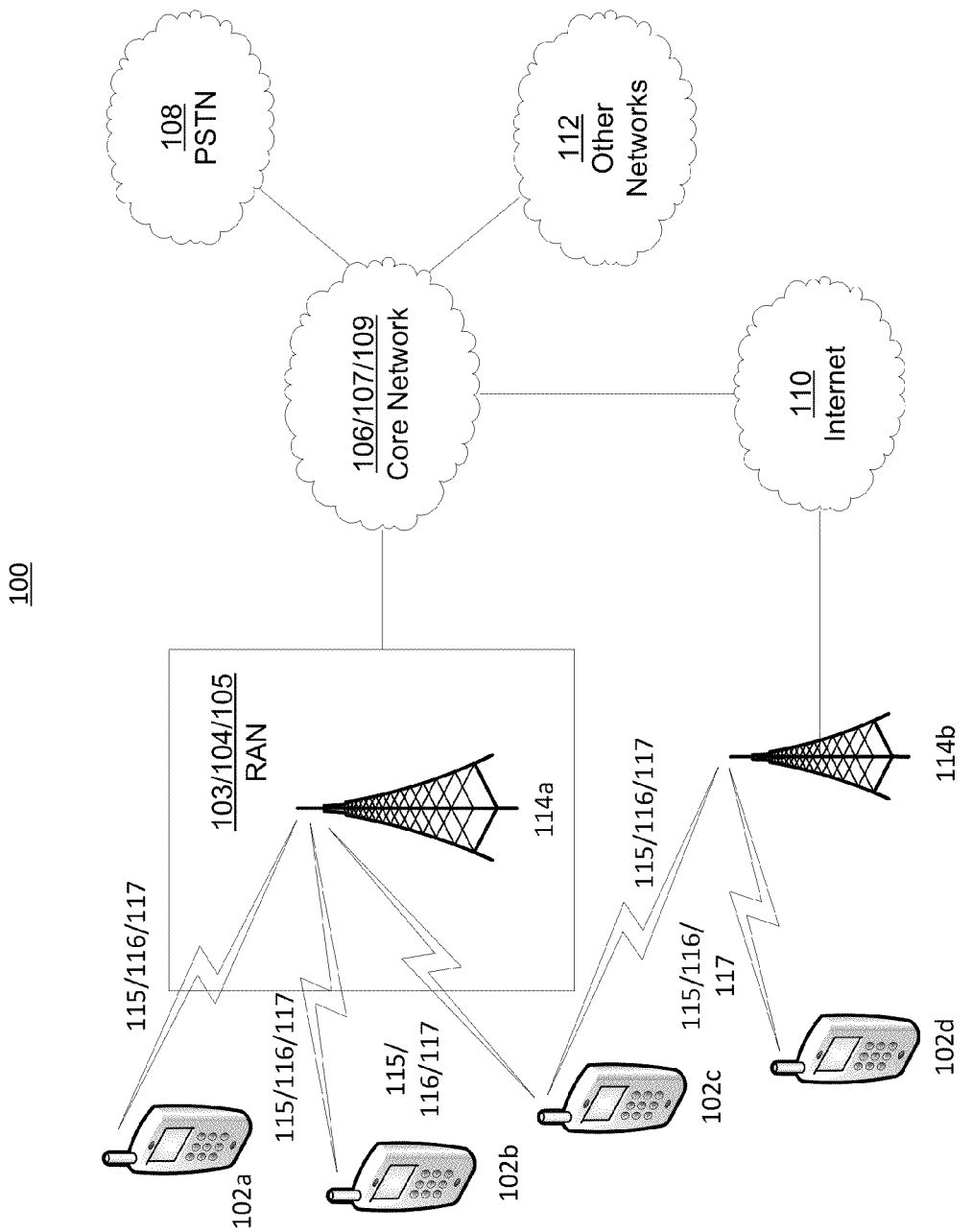
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, or the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
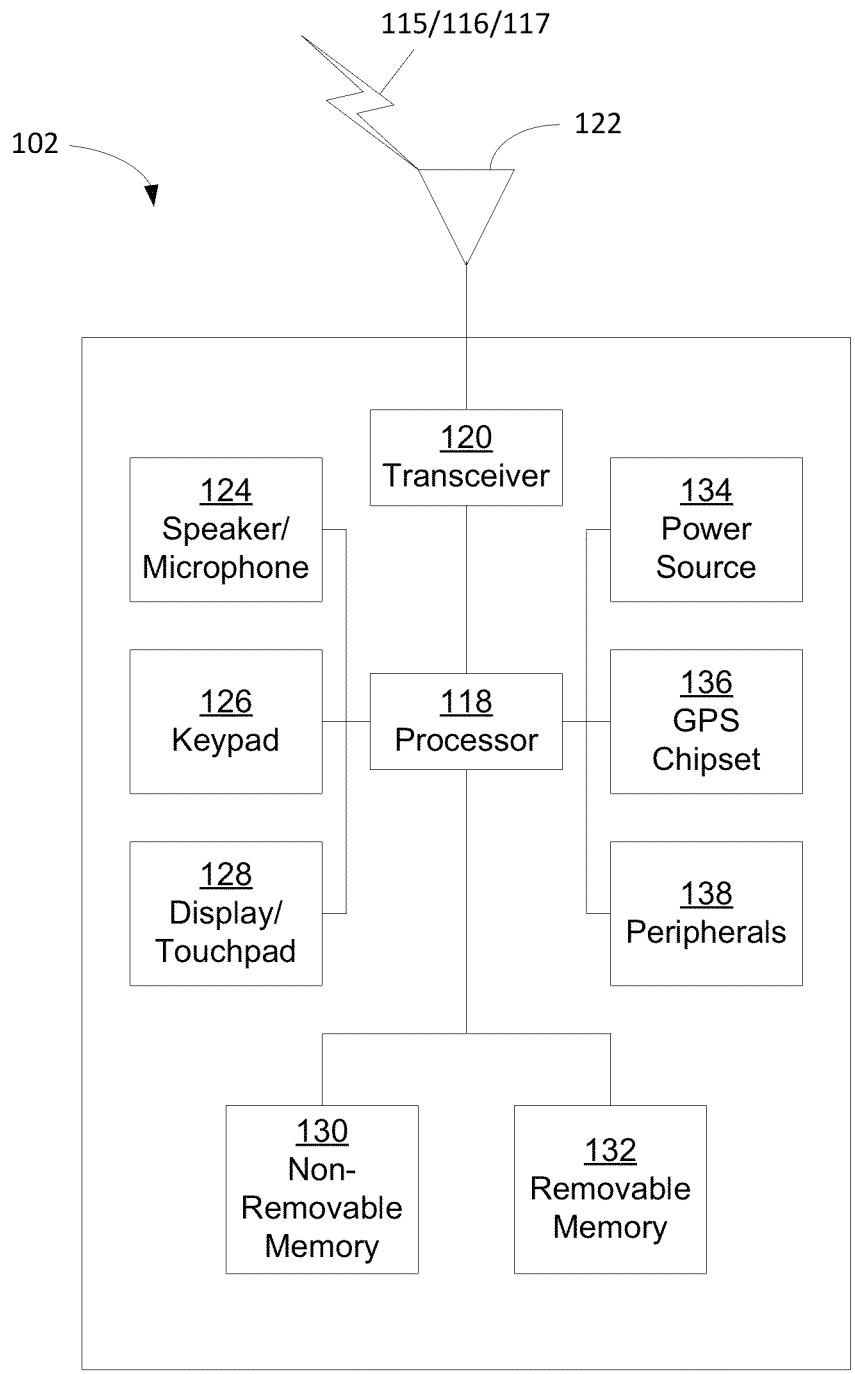
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
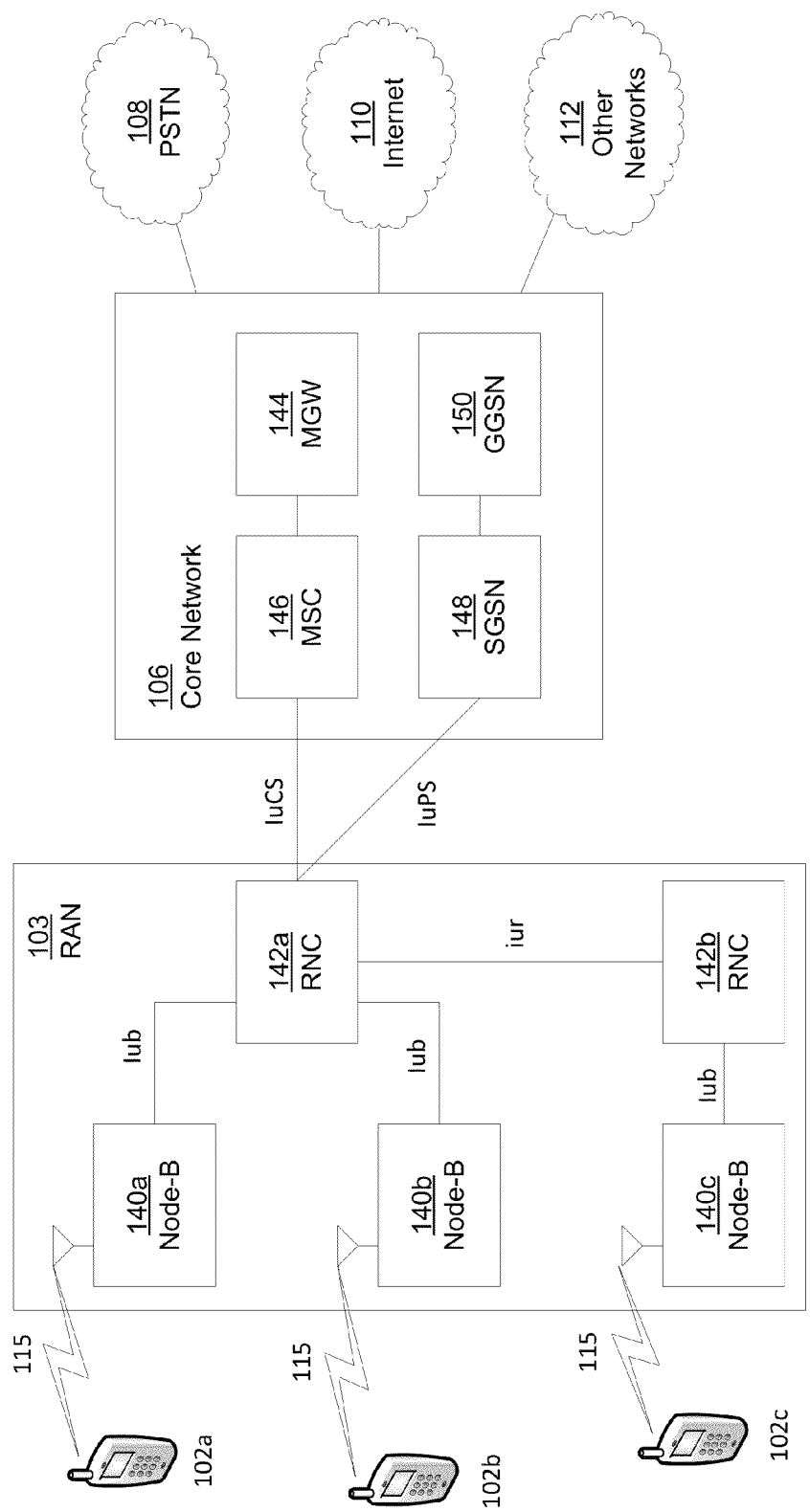
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
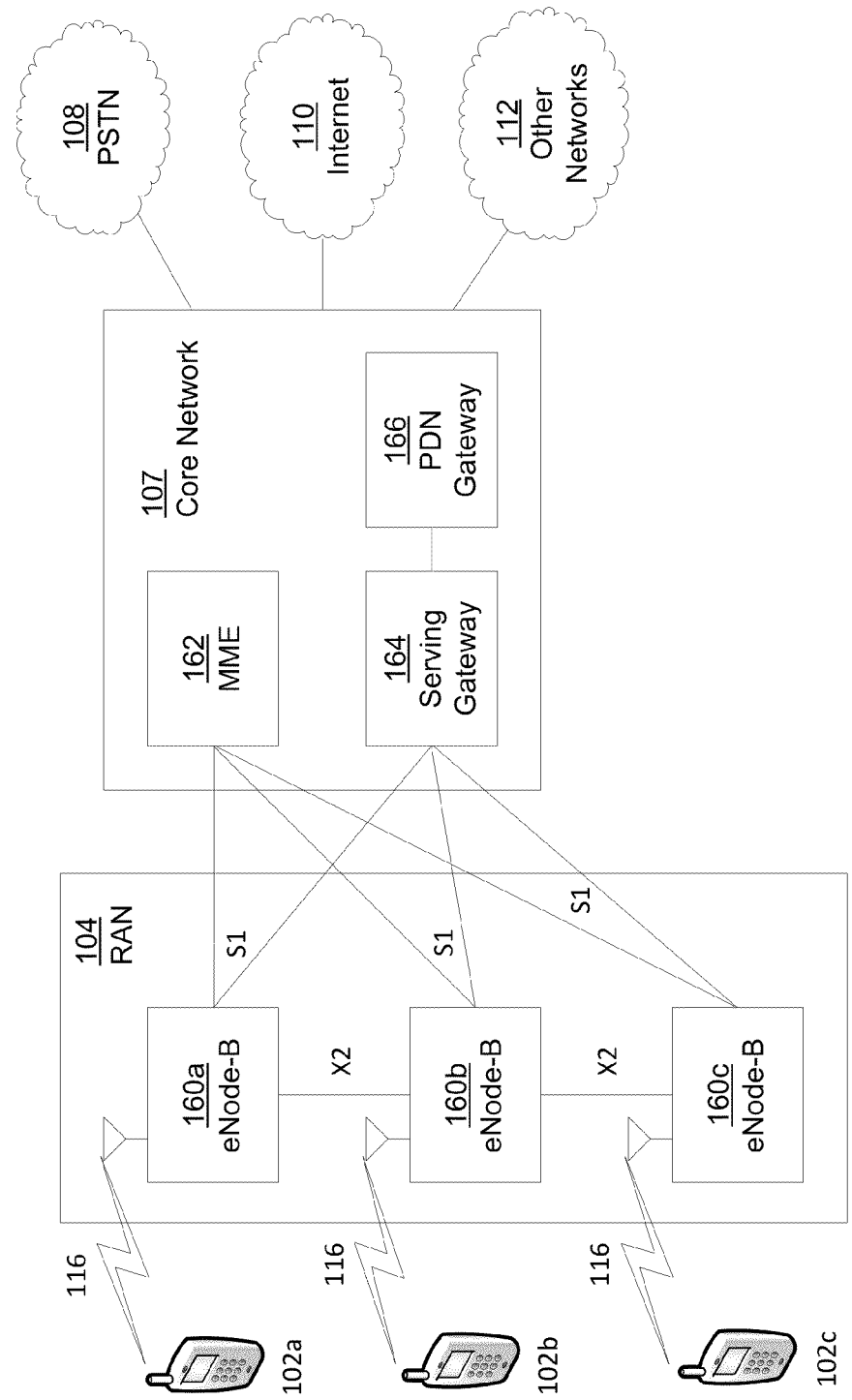
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
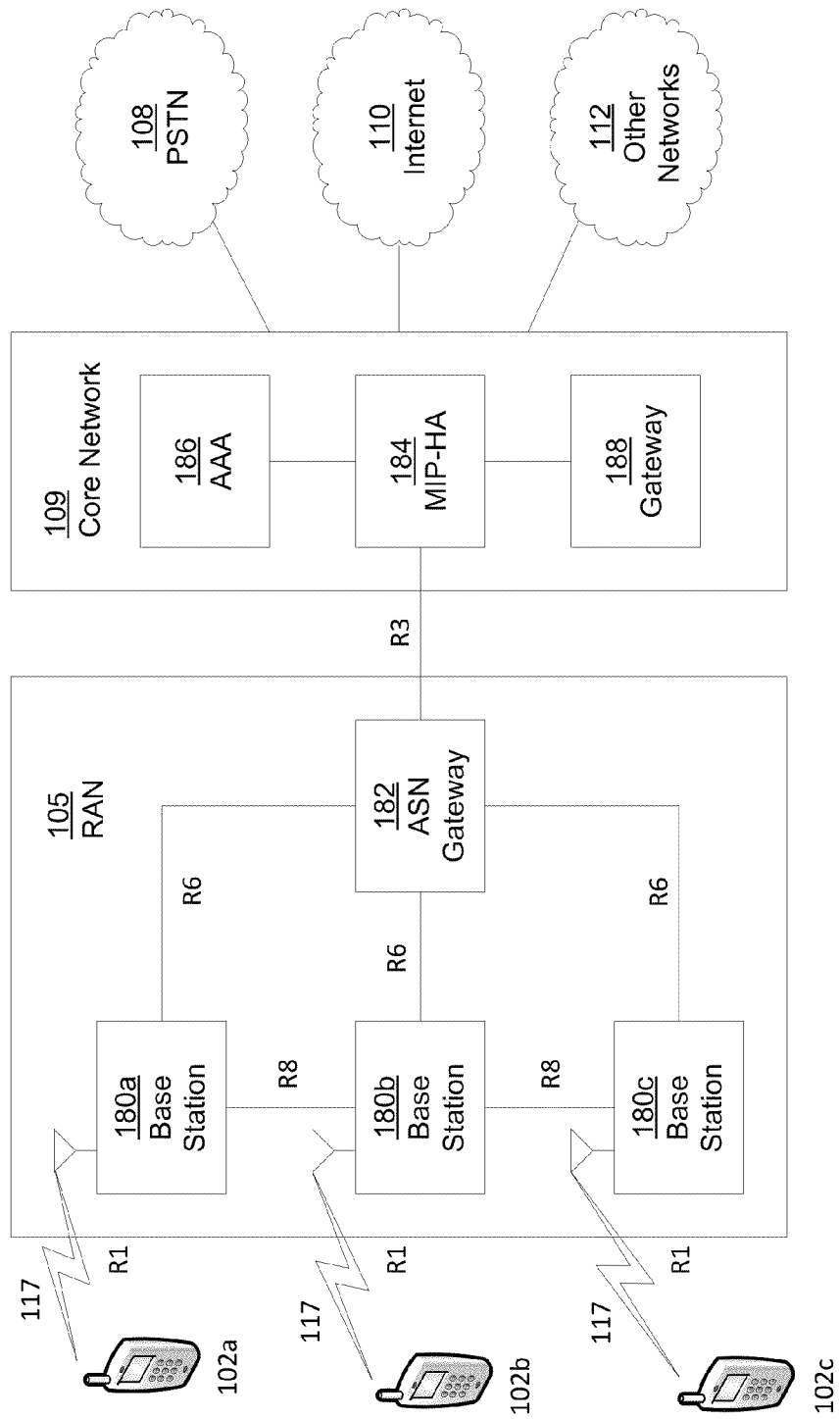
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
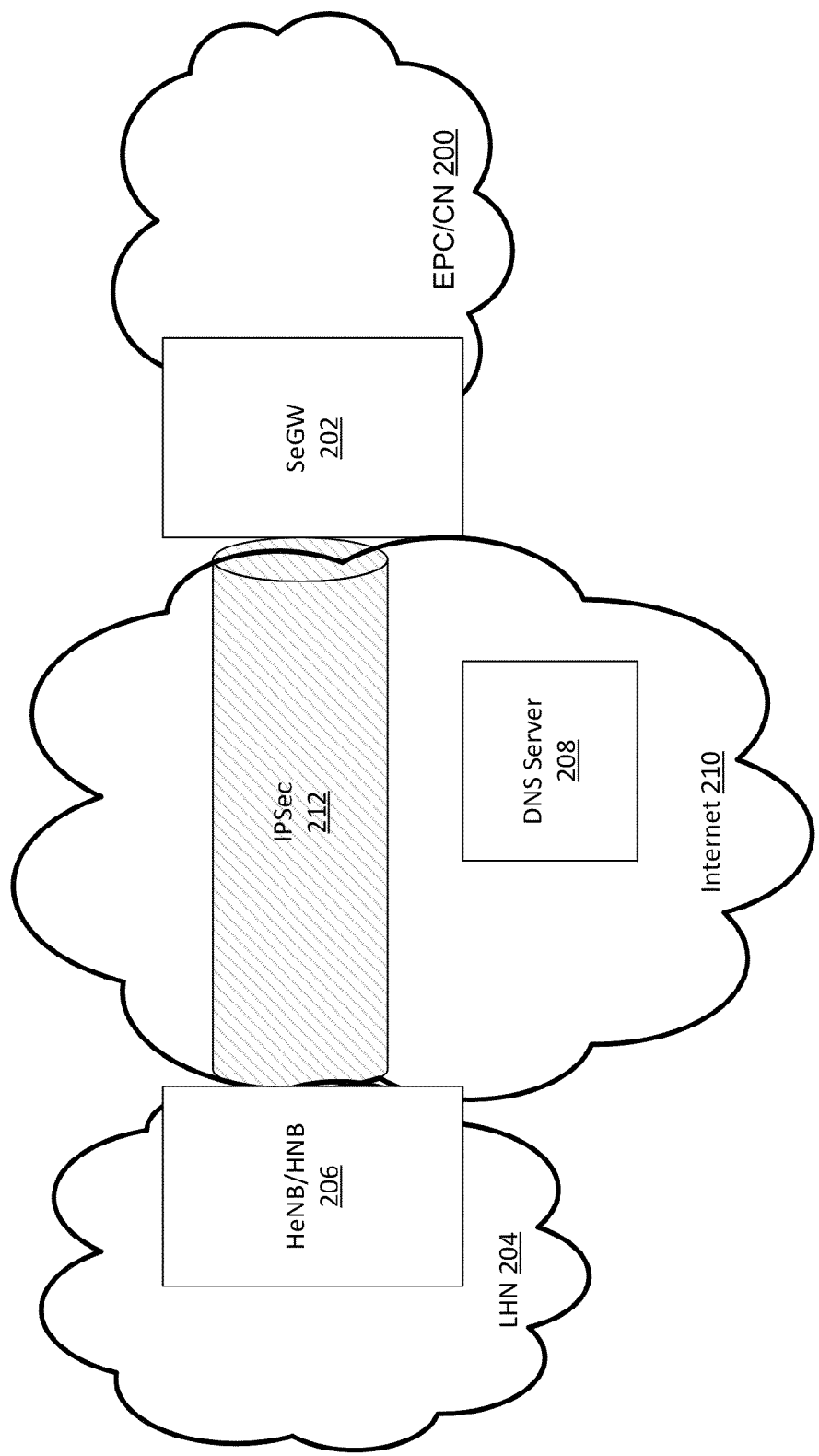
FIG. 2 depicts an example non-edge based architecture such as a non-converged gateway (CGW) and/or non-local gateway (LGW) based architecture.

As described herein, a wireless communication system may include an architecture such as a LTE or UMTS without an edge component such as a CGW and/or LGW. FIG. 2 depicts an example of an evolved packet core (EPC) architecture or core network (CN) 200 that may not have an edge component such as a CGW and/or a LGW in a LTE/UMTS architecture. According to examples, the EPC architecture or CN 200 may be the example core network 106/107/109 shown in FIGS. 1A and 1C-1E and/or may include one or more components of the core network 106/107/109 described in FIGS. 1A and 1C-1E. As shown in FIG. 2, the EPC architecture or CN 200 may include a SeGW 202. The SeGW 202 may be connected to one or more components in a local home network 204 such as a HeNB or HNB 206 as described herein.

For example, the local home network 204 may include the HeNB or HNB 206. In this example architecture, the HeNB or HNB 206 may connect to the SeGW via one or more methods or procedures that may be defined in 3GPP. The HeNB or HNB 206 may resolve the FQDN of an initial or serving SeGW such as the SeGW 202 with a DNS Server 208 that may be in communication with the HeNB or HNB 206 via the Internet 210 and may connect to the SeGW 202 via an IPSec Security Association (SA) and/or an IPSec tunnel 212.

In an example deployment, the HeNB or HNB 206 may have up to three different initial SeGW FQDNs such as a first SeGW or SeGW1, a second SeGW or SeGW2, and/or a third SeGW or SeGW3, which may be factory programmed (e.g., although one SeGW such as SeGW 202 may be shown in FIG. 2). The HeNB or HNB 206 may try to establish an IPSec SA with the first SeGW or SeGW1. The HeNB or HNB 206 may then try to establish a tunnel via or through the Internet 210 such as an IPsec tunnel 212. For example, the HeNB or HNB may try to establish an IPsec SA with the second SeGW or SeGW2 if it may not be able to establish IPsec SA with the first SeGW or SeGW1 to reach a network that may belong to an operator. The HeNB or HNB 206 may use the third SeGW or SeGW3 if it may not be able to establish an IPsec SA with either the first SeGW or SeGW1 or the second SeGW or SeGW2.

After establishing an IPsec SA with one of the programmed Initial SeGWs such as the SeGW 202 (e.g., which may be one of the first, second, or third SeGWs), the HeNB or HNB 206 may establish a TR-069 session with the Auto Configuration Server (ACS) in an EPC (e.g., such as EPC 200) through a secure tunnel. For EPC, the ACS may be a Home eNode B Management System (HeMS)/Home Node B Management System (HMS). The initial and serving SeGW and/or the Initial and serving HeMS and/or HMS may be the same. If they are not the same, the HeNB or HNB 206 may connect to the serving SeGW (e.g., such as 206) and/or serving HeMS and/or HMS in the same manner or using the same techniques as the HeNB or HNB 206 may connect to the initial SeGW and/or initial HeMS/HMS.

In an example, the HeNB or HNB 206 may not have initial SeGW details programmed or the HeNB or HNB 206 may not be able to establish an IPsec SA with one or more programmed SeGWs. The HeNB or HNB 206 may try to establish TR-069 session with the ACS, HeMS, and/or HMS. The procedure to allow the HeNB/HNB to connect to the EPC may be the same.

If the SeGW such as SeGW 202 may not be available after establishing an IPsec SA with the HeNB or HNB 206, a Dead Peer Detection (DPD) mechanism in the HeNB or HNB 206 may identify the non-availability of the SeGW 202. The HeNB or HNB 206 may try to establish IPsec SA with the previously connected SeGW. If the previously connected SeGW may not be available, the HeNB or HNB 206 may try to establish IPsec SA with other available serving SeGWs.

Figure 3:
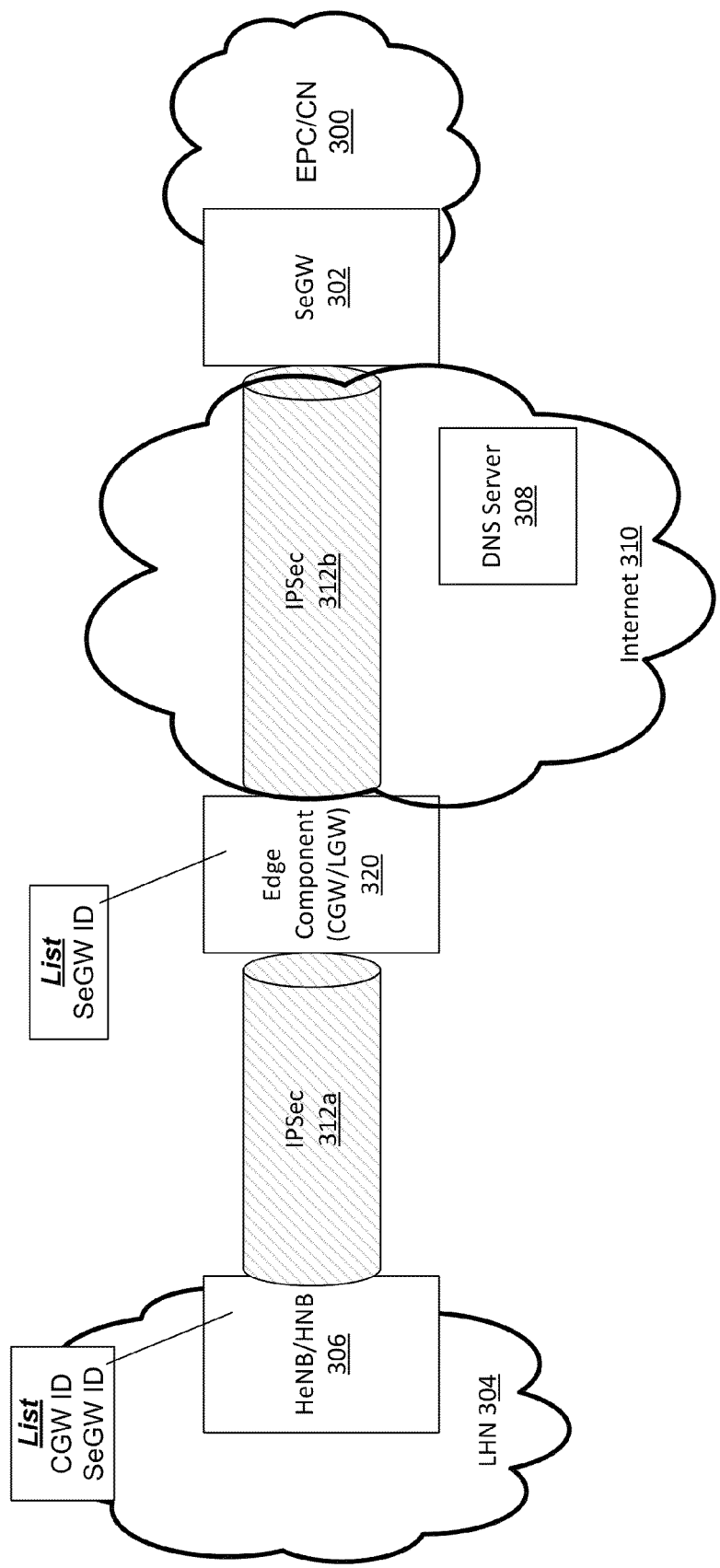
FIG. 3 depicts an example of an edge based architecture such as a CGW and/or LGW based architecture.

As described herein, in an example architecture such as an example LTE and/or UMTS architecture, an edge component such as a CGW and/or a LGW may be provided between components of a LHN and components of an EPC or CN. FIG. 3 depicts an example architecture that may include an edge component. As shown in FIG. 3, an edge component 320 may be located, for example, at an edge of the Internet 310 between the HeNB or HNB 306 in a LHN 300 and a SeGW 302 in an EPC and/or CN 300. In an example, IPsec processing may occur with the edge component 320. As such, the edge component 320 may support an IP Sec tunnel towards the HeNB and/or HNB 306 such as IPSec tunnel 312a and may support an IP Sec tunnel such as IPSec tunnel 312b towards the SeGW 302 (e.g., the initial SeGW and/or serving SeGW).

In an example, in the edge component based architecture of FIG. 3, the HeNB and/or HNB 306 may have a FQDN of the edge component 320 factory programmed along with an initial FQDN of the SeGW 302. The HeNB and/or HNB 306 may also have multiple FQDNs associated with multiple edge components factory programmed (e.g., in a multiple edge component architecture topology). For purposes of illustration, the HeNB/HNB may have an FQDN list. The FQDN list may include one or more edge component IDs such as CGW1, CGW2, and a SeGW ID such as SeGW1 (e.g., in that order). For this scenario, the HeNB and/or HNB 306 may try to establish an IPsec SA with a first edge component such as a CGW1. Failing that, it may attempt to form an IPSec with a second edge component such as CGW2 (e.g., where either of the CGW1 or CGW2 may be the edge component 320 shown in FIG. 3). If both of these fail, the edge component 320 may attempt to establish a connection with a SeGW such as a SeGW1 (e.g., which may be SeGW 302). In addition, the edge component 320 may have one or more SeGW FQDNs configured, for example, SeGW1, SeGW2, and/or SeGW3 (e.g., when there may be multiple SeGWs supported).

Different network topologies may be provided in example embodiments. Such topologies may include one or more of the following: SeGWs may be connected to different HeNB-GWs and/or HNB-GWs (not shown) and/or different EPC or UMTS core networks, HeNB-GWs may be optional (e.g., in an LTE architecture, one or more edge components such as the edge component 320 may or may not be used, and/or different use cases may be provided (e.g., when a network element, such as a HeNB and/or HNB 306, the edge component 320, the SeGW 302, and/or the like may fail).

For example, as described herein and shown in FIG. 3, the edge component 320 that may be located at the edge of the internet 310 may be in communication with a component such as HeNB and/or HNB 306 in the LHN 304 and a component such as SeGW 302, a MME, PDN, and/or the like in EPC and/or CN 300 such that the edge component 320 may act as an intermediary between such components. The edge component 320 and/or the HeNB and/or HNB 306, the SeGW 302, and/or the like may also be in communication with a DNS server 308 via the internet 310. The edge component 320 may provide and/or enable the component in the local home network to be connected to the EPC and/or CN 300 and one or more components network therein (e.g., the edge component 320 may enable network connectivity between the components of the LHN 304 and the EPC and/or CN 300). Unfortunately, the edge component 320, one or more components such as the HeNB and/or HNB 306, and/or the like of the LHN 304, and/or one or more components such as the SeGW 302, a MME, a PDN, and/or the like may fail such that network connectivity may be lost. Currently, there may not be sufficient methods, techniques, and/or procedures to handle a failure thereby preventing a loss in network connectivity and/or providing a robust network. Systems and/or methods described herein may enable the failure of, for example, the HeNB and/or HNB 306, the edge component 320, the SeGW 203, and/or the like to be handled and connectivity to be maintained and/or reestablished as described herein.

Figure 4:
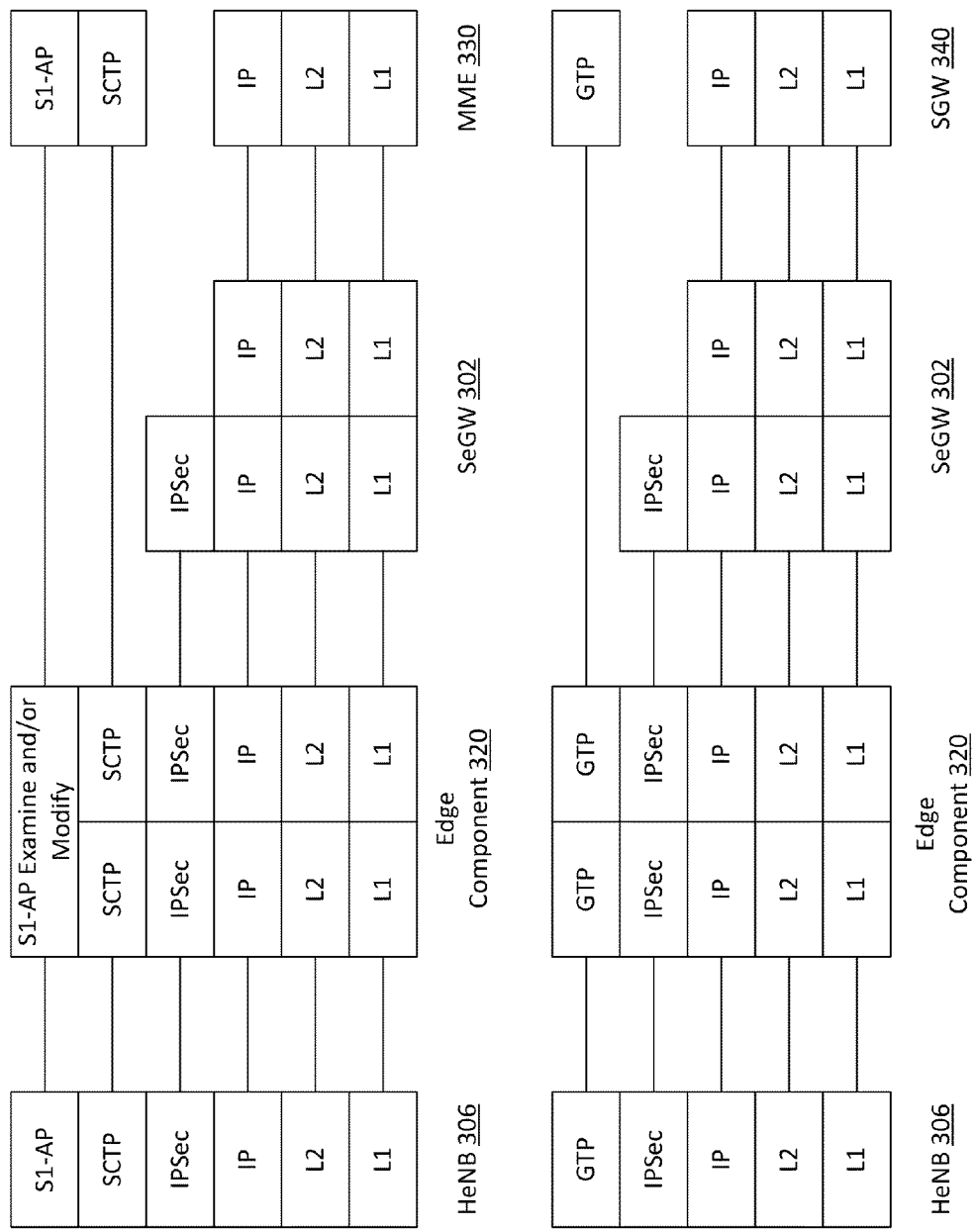
FIG. 4 depicts an example of protocol termination points in an edge based architecture such as a CGW and/or LGW architecture.

FIG. 4 depicts example protocol termination points in an architecture with an edge component such as the edge component 320. For example, the edge component 320 may handle a number of protocols and/or tunnels. As shown in FIG. 4 and described herein, an IPSec may terminate at the edge component 320 from the HeNB 306 and SeGW 302. GTP may terminate at the edge component 320 from the HeNB 306 and SGW 340 (e.g., which may be the same as the SGW described in FIGS. 1A and 1C-1E). SCTP may terminate at the edge component 320 from the HeNB 302 and a MME 330 (e.g., which may be the same as the MME described in FIGS. 1A and 1C-1E). In an example, S1-AP may not terminate at the edge component 320, the edge component 320 may examine and/or modify some of the parameters in these messages.

In an example (e.g., when a failure may occur), the edge component 320 may ensure that its placement may not compromise a recovery mechanism, protocol, technique, and/or method that may exist in the HeNB 306 and components such as the SeGW 302, MME 330, SGW 34, and/or the like in the EPC or CN 300 as tunnels such as 312a, 312b and/or protocols that may terminate at the edge component 320 may be allowed to pass through the edge component. In example architectures, multiple HeNBs and/or HNBs may be supported and/or provided, which may be connected to an edge component such as a single CGW and/or LGW (e.g., multiple HeNBs 306 may be connected to the edge component 320). As described herein, an edge component such as the edge component 320 may support failover recovery when the edge component 320 itself may fail, when the HeNB and/or HNB 306 may fail, when the SeGW 302 may fail, and/or the like (e.g., when they may be disconnected or otherwise not available for use).

For example, the edge component 320 may fail. To handle such a failure, a HeNB such as the HeNB 306 may be provisioned with a list 307 (shown in, for example, FIGS. 5-8) of devices to which it may connect. The list 307 of devices may include an edge component ID (e.g., CGW ID) and a SeGW ID. The edge component 320 may be provisioned with a list 322 (shown in, for example, FIGS. 5-8), which may include a SeGW ID that it may connect to. Each of these lists 307, 322 may include device identifiers for components it may be connected to initially or subsequently in a serving capacity. In an example, the number of components such as SeGWs, edge components, and/or the like may vary. For example, multiple SeGW IDs may be provided for each of the SeGWs the edge component 320 and/or HeNB and/or HNB 306 may connect to. Additionally, multiple edge component identifiers may be provided for each edge component the HeNB and/or HNB 306 may connected to.

Figure 5:
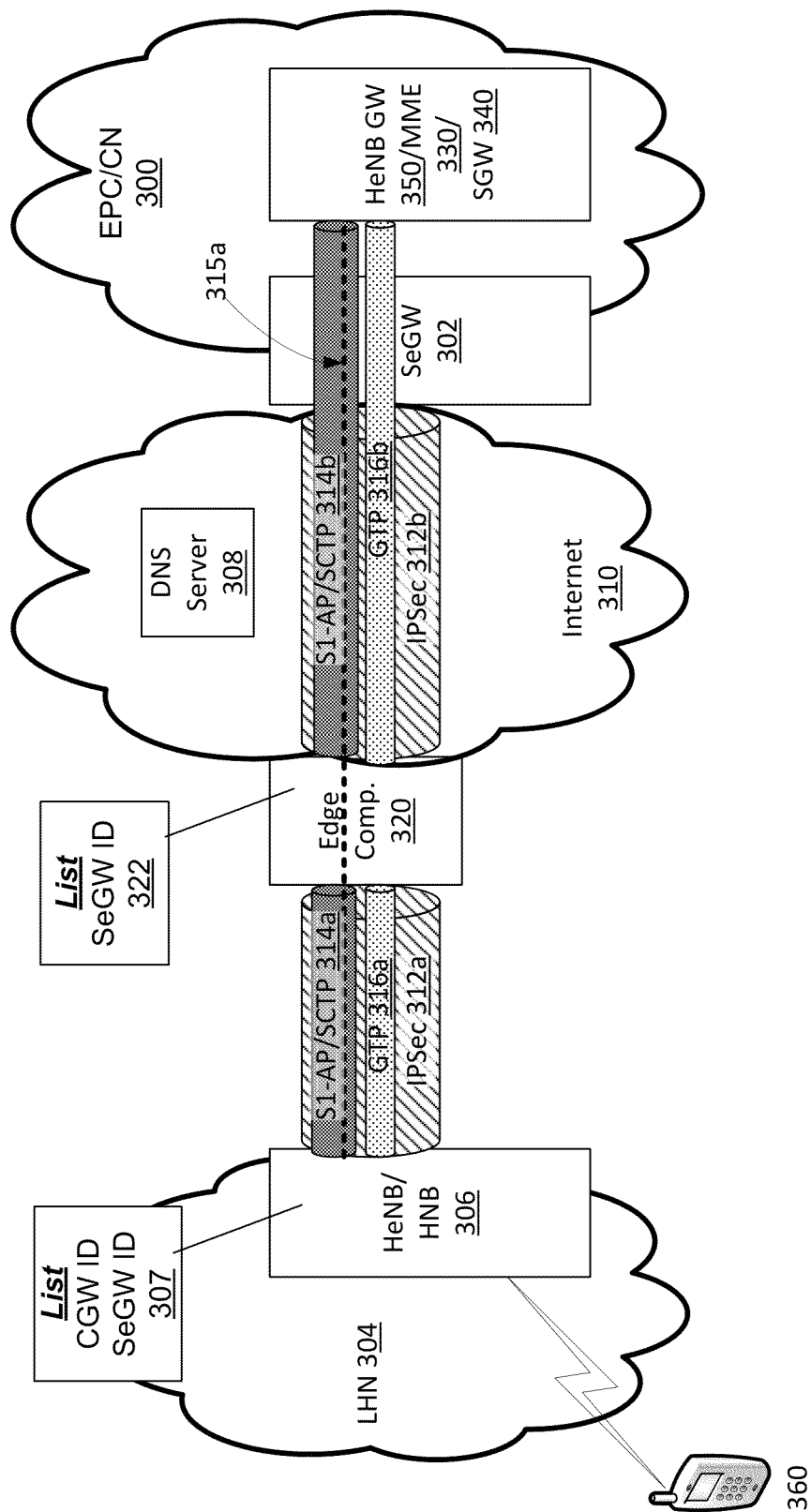
FIG. 5 depicts an example of an edge component such as a CGW and/or LGW, for example, before a failure of the component (e.g., pre-failure).
Figure 6:
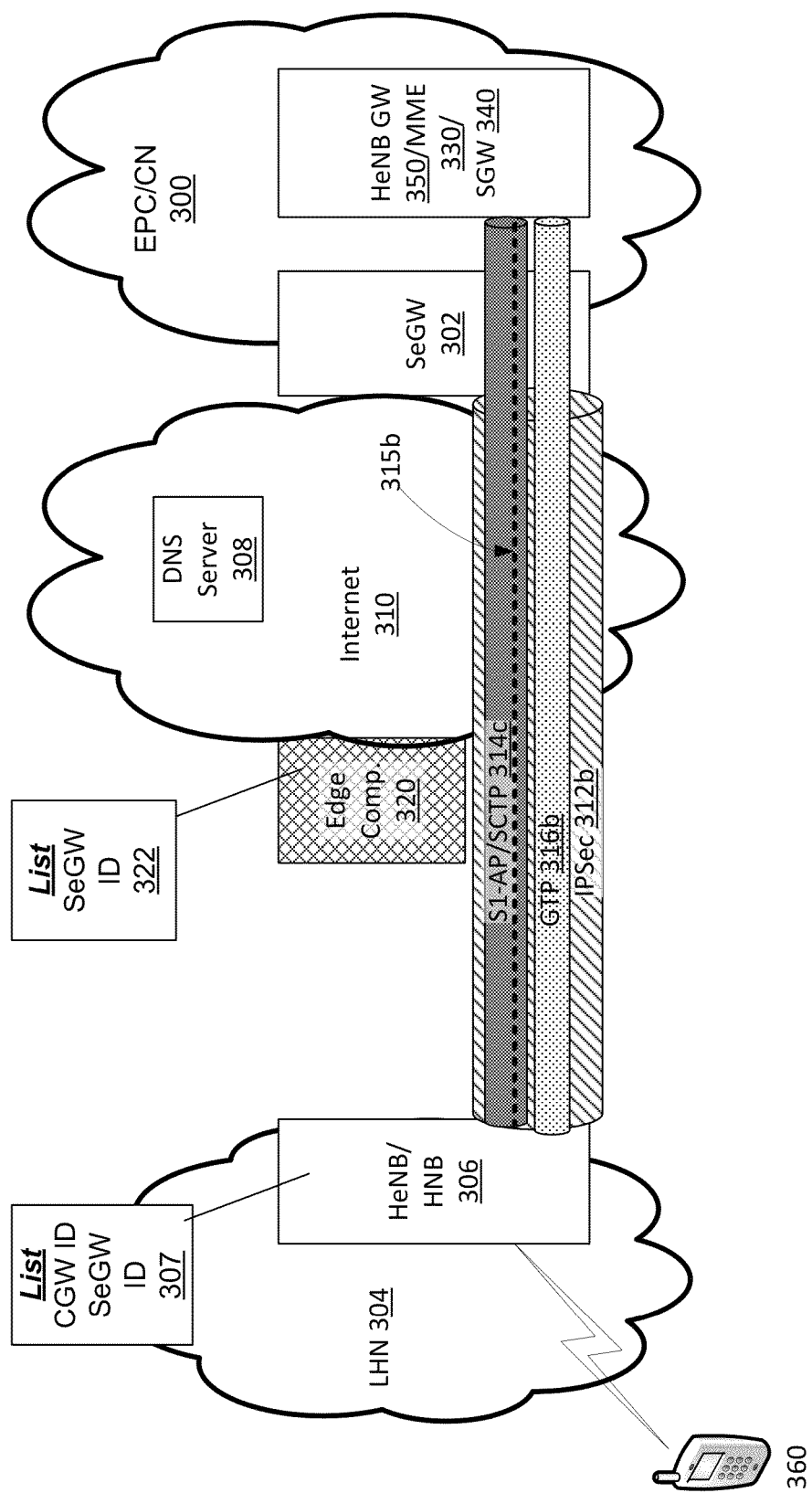
FIG. 6 depicts an example of an edge component such as a CGW and/or LGW, for example, after a failure of the component (e.g., post-failure).

FIGS. 5-6 depict an example embodiment of an edge component such as the edge component 320 prior to and after, respectively, an edge component failure. In an example as shown in FIGS. 5 and 6, SCTP (e.g., 314a, 314b, 314c) may be shown as a tunnel for illustration purposes although it should be appreciated it may not be a tunnel. The SCTP 314a, 314b, and/or 314c may encapsulate S1-AP signaling 315a, 315b. One or more components such as a HeNB GW 350, MME 330 and/or SGW 340 may be a single unit or element in the EPC or CN 300 or, in an additional or alternative example, the components may be separate elements within the EPC or CN 300. The HeNB GW 350 may be optional in some embodiments.

As shown in FIG. 5 (e.g., prior to an edge component failure), the edge component 320 may resolve an identifier of a SeGW or other component such as a SeGW ID. For example, the edge component 320 may access the list 322 that may be provisioned or included therein to determine a SeGW such as the SeGW 302 associated with the SeGW ID such that the edge component 320 may resolve the SeGW ID. The edge component 320 may connect to the SeGW 302 (e.g., based on or upon resolution), may establish an IP Sec tunnel 312b, and may establish an SCTP association 314b with an MME such as the MME 330.

In an example, the HeNB and/or HNB 306 may resolve an identifier of an edge component (e.g., CGW ID), a SeGW (e.g., SeGW ID), or other components. For example, the HeNB and/or HNB 306 may access the list 307 that may be provisioned or included therein to determine an edge component such as the edge component 320 associated with the CGW ID such that the HeNB and/or HNB 306 may resolve the CGW ID. The HeNB and/or HNB 306 may connect to the edge component 320 (e.g., based on or upon resolution), may establish an IP Sec tunnel 312a, and may establish an SCTP association 314a with the edge component 320.

The HeNB and/or HNB 306 may establish an S1-AP association (e.g., 315a) with the MME 330. As described herein, the S1-AP messages and/or association may be encapsulated in the SCTP 314a, 314b as shown. As such, the S1-AP messages may pass through the edge component 320, using the SCTP association 314a between the HeNB and/or HNB 306 and the edge component 320 and the SCTP association 314b between the edge component 320 and MME 330 (e.g., via the SeGW 302).

A device 360 such as a UE or WTRU (e.g., including WTRUs 102a-d shown and described in FIGS. 1A-1E) may attach to the EPC or CN 300 through the HeNB and/or HNB 306 and the edge component 320. In an example, as part of the attach procedure, the device 360 may be given a default bearer and/or GTP tunnels may be established such as a H(e)NB-edge component GTP tunnel 316a and an edge component-SGW GTP tunnel 316b.

As described herein, the edge component 320 may fail (e.g., may be offline, may go down, and/or may not otherwise be accessible). In an example, to detect such a failure, dead peer detection (DPD) may be provided and/or used. For example, DPD in or associated with the HeNB and/or HNB 306 and SeGW 302 may detect an IPSec failure (e.g., when the SeGW 302 and/or HeNB and/or HNB 306 may no longer be connected to the edge component 320 via the IPSec 312a and/or 312b). In such an example, the SCTP association 314a and/or 314b may time out such that no heartbeat messages or acknowledgements thereof may be received by or in the HeNB and/or HNB 306 and/or MME. The S1-AP associations 315a, 315b (e.g., in response to no heartbeat messages) may be torn down and/or the GTP associations 316a, 316b between the HeNB and/or HNB 306 and edge component 320 and/or the edge component 320 and SGW 340 may be torn down.

The HeNB and/or HNB 306 may attempt to reconnect to the edge component 320, however, since the edge component 320 may be down, this may fail. In an example, the HeNB and/or HNB 306 may resolve the SeGW ID using the list 307 as described herein, may establish an IP Sec tunnel 312c, and may establish an SCTP association 314c directly to the MME 330 (e.g., via the SeGW 302). For example, the HeNB and/or HNB 306 may establish a S1-AP association (e.g., 315b) with the MME 330.

For example, as shown in FIG. 6 (e.g., after the edge component failure), the HeNB and/or HNB 306 may resolve the SeGW ID using the list 307 such that the HeNB and/or HNB 306 may connect to the SeGW 302 instead of the edge component 320, may establish an IPSec tunnel 312c with the SeGW 302. The HeNB and/or HNB 306 may establish the S1-AP association 315b directly to the MME (e.g., via the IPSec tunnel 312b and/or SeGW 302). The HeNB may also establish a GTP tunnel 316c directly to the SGW 340 as shown. Further, the device 302 that may be attached to the HeNB and/or HNB 306 and may be managed by the edge component 320 may re-attach to the network. Data sessions that may have been in progress may be lost and may be re-established.

If multiple edge networks may be used (not shown) and one of the edge components such as the edge component 320 fails, the procedures described herein may also support moving from one edge component (e.g., which may be a failing unit) to another CGW (e.g., which may be a non-failing one). This may be performed by configuring the list (e.g., 307) of devices within the HeNB and/or HNB 306. For the case of moving from one edge component to another, the list within the edge components may include a CGW ID 1 and CGW ID 2, and/or the like.

In an example, where the edge component 320 itself may be the failing device, there may be no actions performed by the edge component. The failover mechanism may be handled by configuring the other devices whose communications may pass through the CGW on how to re-connect if they may lose their connections through the CGW. For example, the device 360, the HeNB and/or HNB 306, and/or one or more components of the EPC and/or CN 300 such as the SeGW 302, the MME 330, the SGW 340, and/or the HeNB GW 350 may provide an indication of how to reconnect and/or may include procedures and/or methods to reconnect.

In an example, a SeGW may fail. The edge component 320 may support failover recovery when a SeGW may fail. For example, the edge component 320 may switch from one SeGW that may be failing to another SeGW that may not be failing to maintain a connection or connectivity between the HeNB and/or HNB 306 and the CN or EPC 300.

Figure 7:
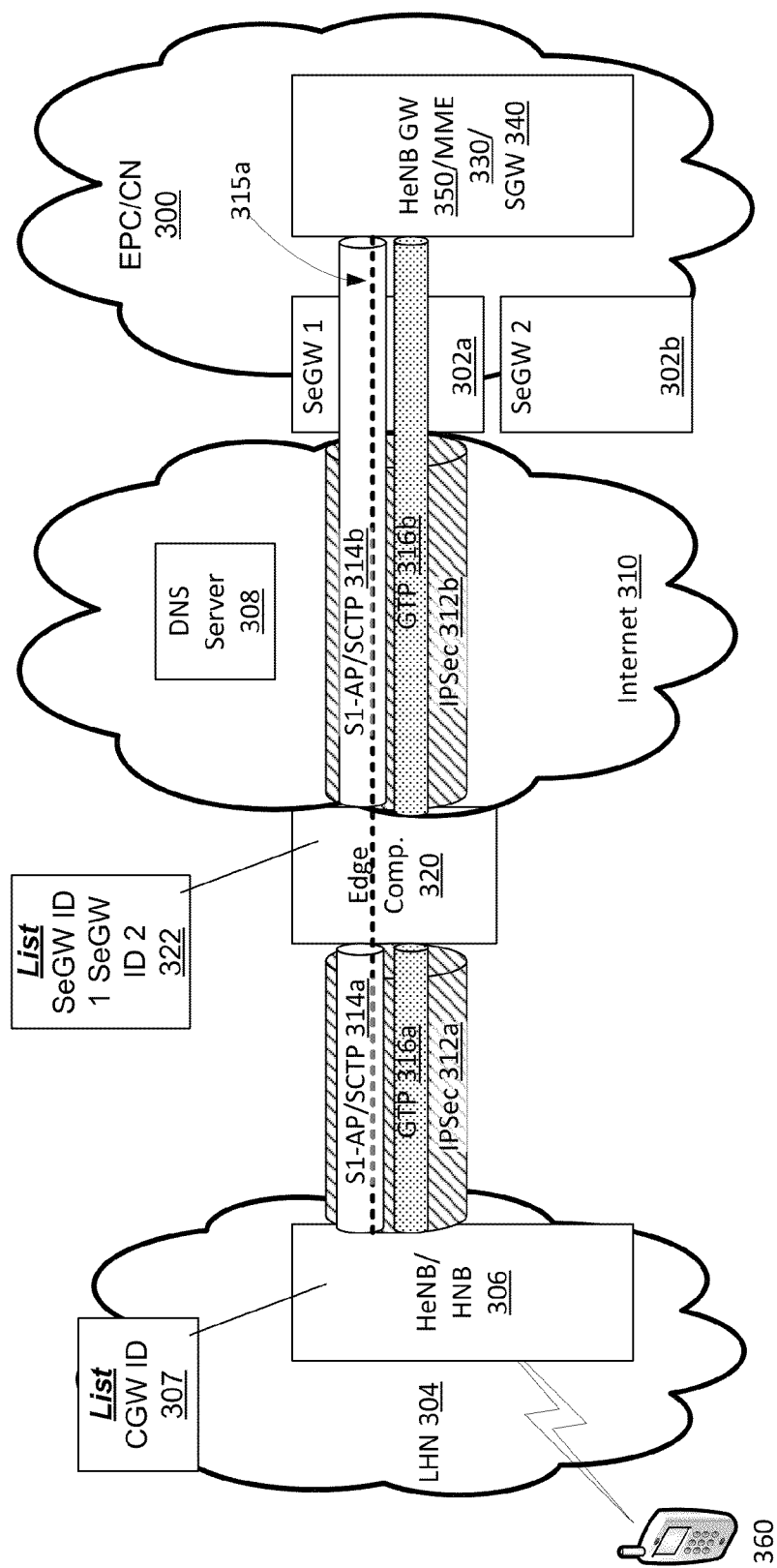
FIG. 7 depicts an example of a wireless network component such as a SeGW, for example, before a failure of the component (e.g., pre-failure).
Figure 8:
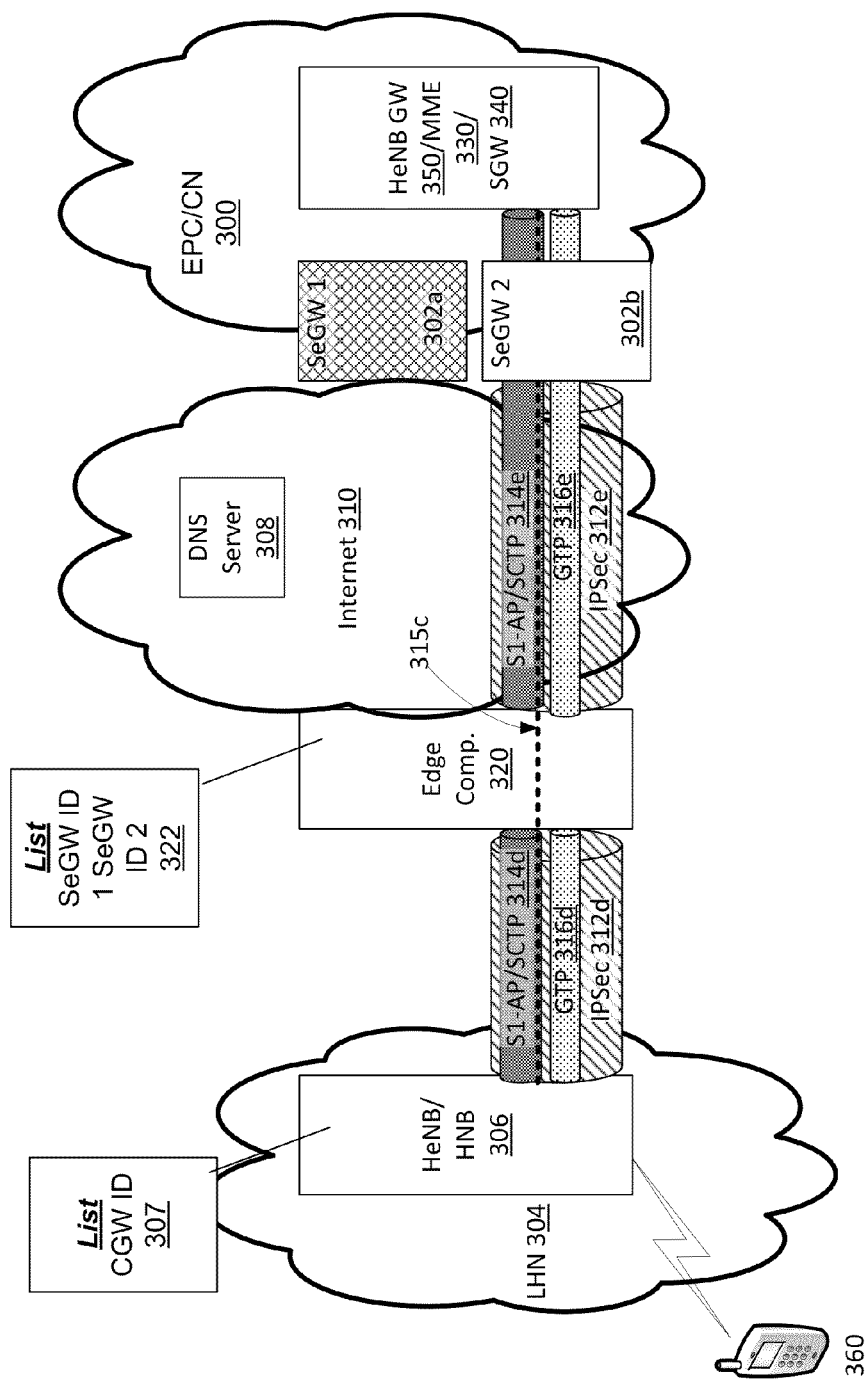
FIG. 8 depicts an example of a wireless network component such as a SeGW, for example, after a failure of the component (e.g., post-failure).

FIGS. 7-8 depict example embodiments of a SeGW failure scenario, pre-failure and post-failure respectively. In the example shown in FIGS. 7 and 8, SCTP (e.g., 314a, 314b, 314d, and/or 314e) may be shown as a tunnel for illustration purposes although it may be appreciated that it may not be a tunnel. The SCTP may encapsulate S1-AP signaling as shown in 314a, b, d, and/or e (e.g., the SCTP packets may encapsulate the S1-AP signaling 315a, 315c). One or more components such as a HeNB GW 350, MME 330 and/or SGW 340 may be a single unit or element in the EPC or CN 300 or, in an additional or alternative example, the components may be separate elements within the EPC or CN 300. The HeNB GW 350 may be optional in some embodiments. The HeNB GW 350, MME 330, and/or SGW 340 may be multiple HeNB GWs, multiple MMEs and multiple SeGWs.

As shown in FIG. 7 (e.g., prior to a SeGW failure), the edge component 320 may be connected to a first SeGW 302a such as SeGW 1 and may be provisioned with a list 322 of SeGWs that it may connect to. The list may include the identifier of the first SeGW such as SeGW ID 1 and a second SeGW such as SeGW ID 2 that it may connect to. The edge component 320 may resolve SeGW ID 1 (e.g., SeGW1 may be listed first in the list 322 and the edge component 320 may resolve to initially to SeGW 1 based on the order in the list 322). The edge component 320 may connect to the SeGW 302a, may establish an IP Sec tunnel 312b, and may establish an SCTP association 314b with the MME 330.

In an example, the HeNB and/or HNB 306 may resolve an identifier of an edge component such as the edge component 320 (e.g., the CGW ID), may establish an IP Sec tunnel 312a, and may establish an SCTP association 314a with the edge component 320.

The HeNB and/or HNB 306 may establish a S1-AP association (e.g., 315a) with the MME 330. As described herein, the S1-AP messages may pass through the edge component 320, using, for example, the SCTP association 314a between the HeNB and/or HNB 306 and the edge component 320 and the SCTP association 314 between the edge component 320 and MME 330.

A device 360 such as a UE may attach to the core network through the H(e)NB and edge component 360. The device 360 such as a UE or WTRU (e.g., including WTRUs 102a-d shown and described in FIGS. 1A-1E) may attach to the EPC or CN 300 through the HeNB and/or HNB 306 and the edge component 320. In an example, as part of the attach procedure, the device 360 may be given a default bearer and/or GTP tunnels may be established such as a H(e)NB-edge component GTP tunnel 316a and an edge component-SGW GTP tunnel 316b.

In an example, the SeGW 302a may fail. In an example, to detect such a failure, DPD may be provided and/or used. For example, DPD in or associated with the edge component 320 may detect an IPSec failure (e.g., when the IPSec tunnel 312b may no longer be established to connect the edge component 320 to the SeGW 302a). In such an example, the SCTP association 314a may time out such that there may not be heartbeat messages or acknowledgements thereof at or received by the edge component 320 and/or the MME 330. The S1-AP associations (e.g., 315a) encapsulated as shown in 314a, 314b (e.g., in response to no heartbeat messages) between the HeNB and/or HNB 306 and MME 330 may be torn down at the MME 330. GTP associations or tunnels 316a, 316b between the edge component 320 and SGW 340 may be torn down. The HeNB and/or HNB 306 may not have knowledge of or know about the failure of the SeGW 302a, but, in an example, an indication or information may be provided to the HeNB and/or HNB 306 to inform it of the failure.

The edge component 320 may attempt to reconnect to the SeGW 302a, however, since the SeGW 302a may be down, this may fail. In an example (e.g., in response to such a failure), the edge component 320 may resolve SeGW ID 2 (e.g., which may be associated with the SeGW 302b) using the list 322 as described herein. The edge component 320 may connect to the SeGW 302b, may establish an IP Sec tunnel 312d, and/or may establish an SCTP association 314d with the MME 330.

Further, the edge component 320 may tear down the IP Sec 312a to the HeNB and/or HNB 306. This may be used to inform the HeNB and/or HNB 306 that the SeGW 302a may have failed. The DPD in the HeNB and/or HNB 306 may detect and/or indicate an IPsec failure. For example, the SCTP association 314a may time out at the HeNB and/or HNB 306. The device and/or S1 contexts (e.g., associated with 315a) may be cleared at the HeNB and/or HNB 306.

In an example (e.g., after the SeGW 302a may fail), the HeNB and/or HNB 306 may attempt to reconnect to the edge component 320. Since the edge component 320 may be still up, this may succeed. As shown in FIG. 8, the HeNB and/or HNB 306 may establish a SCTP association 314d with the edge component 320. The HeNB and/or HNB 306 may establish a S1-AP association 315c with the MME 330 (e.g., via the SeGW 302b). The S1-AP messages may pass through the edge component, using, for example, the SCTP association 314d between the HeNB and/or HNB 306 and the edge component 320 and an SCTP association 314e between the edge component 320 and MME 330.

Additionally, as the edge component 320 may inform the HeNB and/or HNB 306 that the SeGW 302a may have failed by tearing down the IP Sec SA (e.g., 312a) between the edge component 320 and the HeNB and/or HNB 306, this may alter the H(e)NB and the SCTP connection. As such, S1-AP and GTP tunnels may be restarted as described herein. For example, S1-AP 315c may be restarted in 314d, 314e as shown and GTP tunnels 316d, 3164e may be established as described herein.

The edge component 320 may use other methods to inform the HeNB and/or HNB 306 that SeGW 302a may have failed. For example, the edge component 320 may send an S1-AP reset message to a HeNB and/or HNB (e.g., 306) that it may be managing. This message may be used in place of the edge component 320 tearing down the IP Sec SA 312a with the HeNB. In an example, the Reset message may have a "Reset All" flag that may cause a HeNB to restart its S1AP interface. In addition, the edge component 320 may set the proper IDs in this message so the HeNB may believe it is being sent from the MME 330 and not, for example, the edge component 320.

As another example, an interface may be defined between the HeNB and/or HNB 306 and the edge component 320. The interface may use the SCTP 314a, b, d, and/or e to ferry messages between the HeNB and/or HNB 306 and edge component 320. Over this interface, the edge component 320 may send a message to the HeNB and/or HNB 306 that may inform it that the SeGW 302a may be down. Such a message may restart the S1-AP association 314a with the MME. In an example, this may be used in place of the edge component tearing down the IP Sec SA 312a with the HeNB and/or HNB 306.

Figure 9:
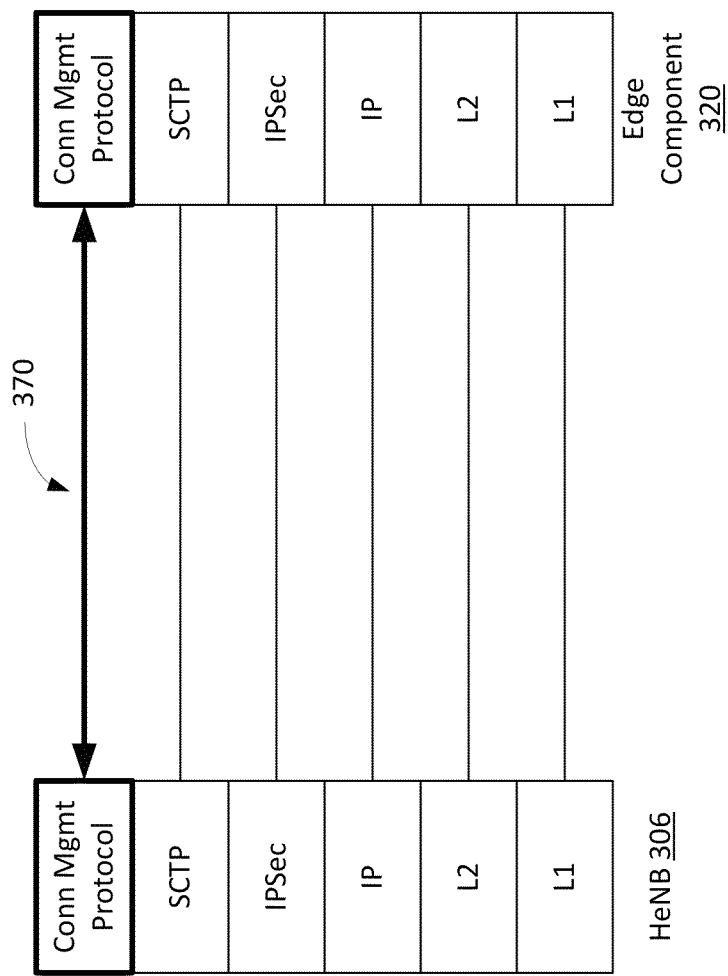
FIG. 9 depicts an example connection management interface (CMI) and the protocol layers thereof

For example, the interface between the edge component 320 and HeNB and/or HNB 306 may be a Connection Management Interface (CMI). FIG. 9 illustrates a CMI 370 and protocol levels associated therewith. As shown, the CMI 370 may be encapsulated in the SCTP session 314a (or 314d with SeGW 302b) between the edge component and HeNB and/or HNB 306. Over this interface (e.g., 370), the edge component 320 and HeNB 306 may engage in discovery and authentication procedures (e.g., at 402 and 404 shown in FIG. 10) so that both the HeNB 306 and the edge component 320 may find each other and know that each may be a trusted entity. In an example, since there may an IPSec connection between the HeNB 306 and edge component 320, the discovery and authentication procedures may be incorporated in the initial connection between the edge component 320 and HeNB 306

Figure 10:
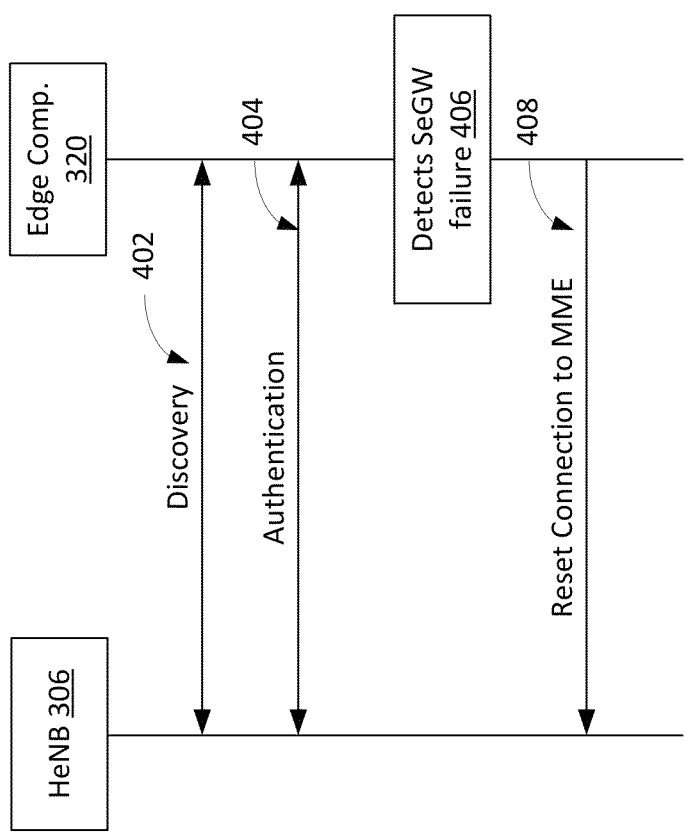
FIG. 10 depicts an example method and/or messages for informing a HeNB and/or HNB of a SeGW failure using a CMI (e.g., the CMI of FIG. 9).

After these procedures, upon the failure of a SeGW such as SeGW 302a such as upon detection of a SeGW failure at 406, the edge component 320 may issue a reset connection such as a reset connection to MME message, request, and/or the like that may be sent to the HeNB 306 at 408 as shown in FIG. 10. In examples, the reset connection to MME message may include one or more fields such as a message type that may be used to identify the message as such a reset message, a reset cause that may be used to indicate what the failure may have been at the SeGW, a nonce that may be used to prevent or reduce a replay attack by a malicious entity, and/or the like.

As another example, the edge component 320 may use the X2 interface to inform the HeNB and/or HNB 306 of the failure. This may use the definition of a new message or the addition of parameters in an existing signal to allow the edge component 320 to inform the HeNB and/or HNB 306 that the SeGW 302a may be down and that it may restart the S1-AP association with the MME. This may be used in place of the edge component 320 tearing down the IP Sec SA 312a with the HeNB and/or HNB 306.

Figure 11:
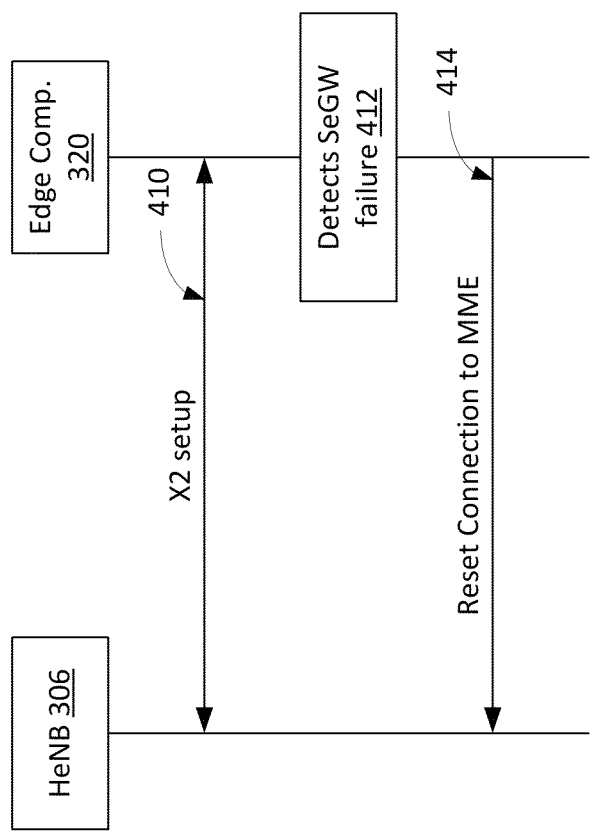
FIG. 11 depicts an example method and/or messages for informing a HeNB and/or HNB of a SeGW failure using an X2 interface.

For example, an X2 interface may exist between HeNBs (e.g., directly between HeNBs) or an X2 interface may be routed through a HeNB focal point or proxy such as the edge component 320. In either example, an X2 interface may be set up between the HeNB 306 and the edge component 320 (e.g., at 410 as shown in FIG. 11). In an example, since there may be an IPSec connection such as the IPSec 312a between the HeNB 306 and edge component 320, the set up (e.g., discovery and authentication procedures) may be incorporated in the initial connection between the edge component 320 and HeNB 320. The edge component 320 may detect a SeGW failure (e.g., at 412). The edge component 320 may send a new X2 message to the HeNB 306 to inform the HeNB 306 of the failed SeGW such as the SeGW 302a (e.g., at 414). This message may be a reset connection to MME message that may be sent to the HeNB 306 at 414 as shown in FIG. 11. The reset connection to MME message may include one or more fields such as a message type that may be used to identify the message as such a reset message, a MME identity that may be used to identify (e.g., uniquely) the MME such as MME 330 to the HeNB, a reset cause that may be used to indicate what the failure may have been at the SeGW, a nonce that may be used to prevent or reduce a replay attack by a malicious entity, and/or the like.

As another example, if the edge component 320 may be a LGW, an $S_{xx}$ interface may be used to inform or indicate to the HeNB that the SeGW 302a may be down such that the S1-AP association with the MME 330 may be restarted. In an example, this may be used in place of the edge component 320 tearing down the IP Sec SA 312a with the HeNB and/or HNB 306.

As shown (e.g., when the SeGW may fail or after failure of the SeGW such as the SeGW 302a), the device 360 that may be attached to a HeNB and/or HNB 306 that may be managed by the edge component 320 may re-attach to the network. Further, data sessions that may have been in progress may have been be lost and may be re-established.

Figure 12:
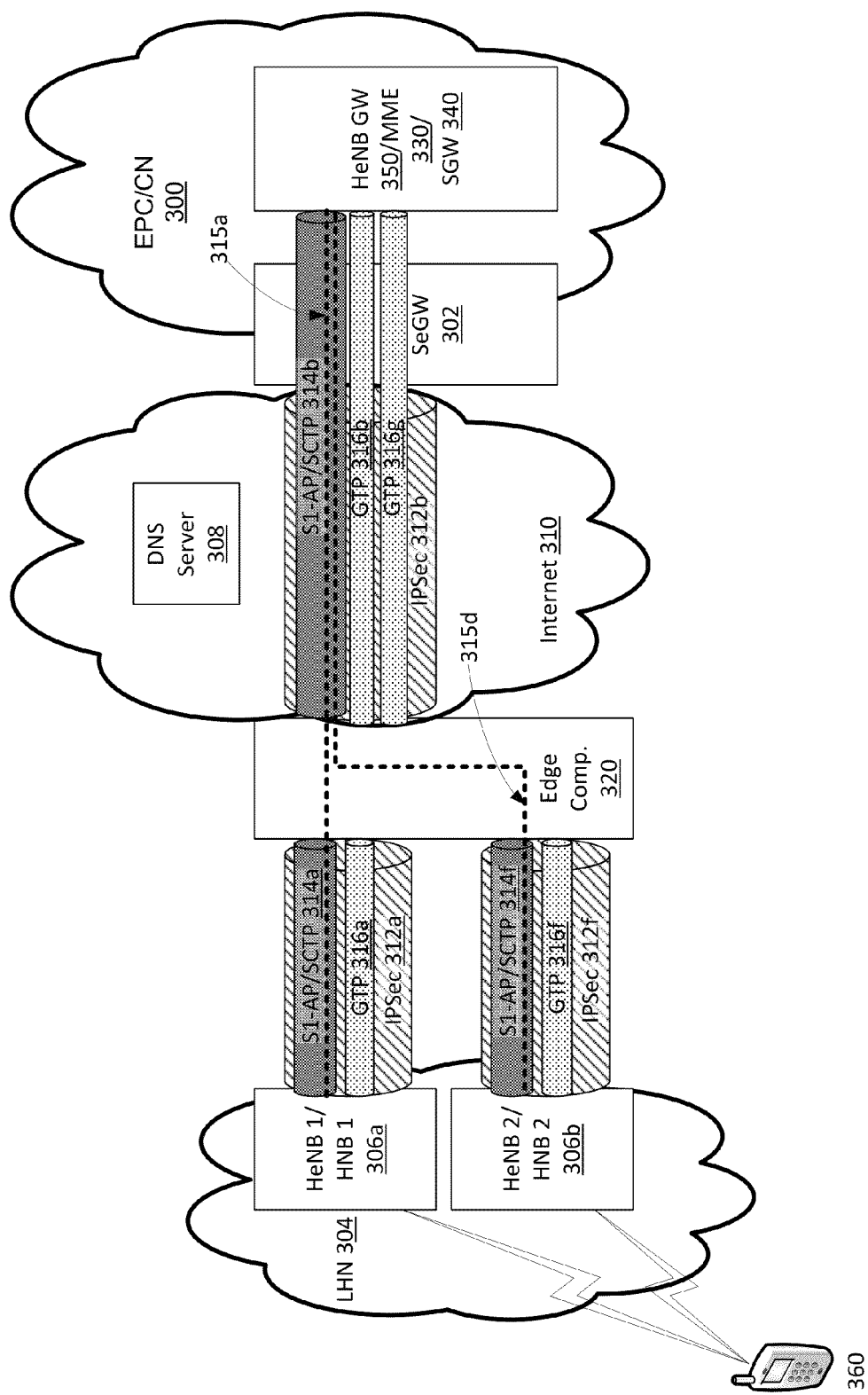
FIG. 12 depicts an example of a local home network component such as a HeNB, a HNB, and/or the like, for example, before a failure of the component (e.g., pre-failure).
Figure 13:
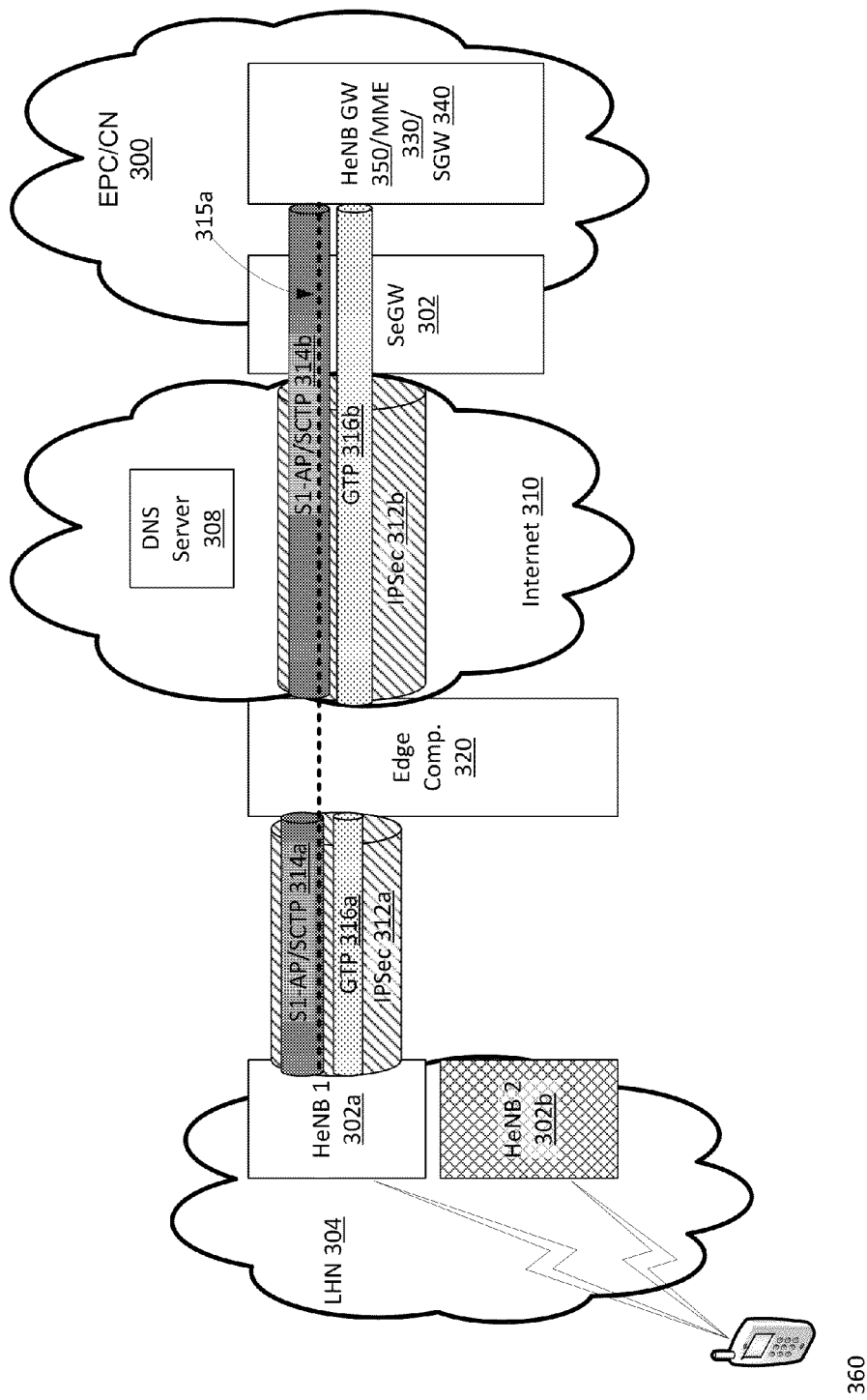
FIG. 13 depicts an example of a local home network component such as a HeNB, a HNB, and/or the like, for example, after a failure of the component (e.g., post-failure).

FIGS. 12-13 depict an example embodiment of a HeNB (and/or HNB) failure scenario, pre-failure and post-failure respectively. In the example shown in FIGS. 12 and 13, SCTP (e.g., 314a, 314b, and/or 314f) may be shown as a tunnel for illustration purposes although it may be appreciated that it may not be a tunnel. The SCTP may encapsulate S1-AP signaling as shown in 314a, b, and/or f (e.g., the SCTP packets may encapsulate the S1-AP signaling 315a, 315d). One or more components such as a HeNB GW 350, MME 330 and/or SGW 340 may be a single unit or element in the EPC or CN 300 or, in an additional or alternative example, the components may be separate elements within the EPC or CN 300. The HeNB GW 350 may be optional in some embodiments. The HeNB GW 350, MME 330, and/or SGW 340 may be multiple HeNB GWs, multiple MMEs and multiple SeGWs.

In an example (e.g., as described herein), an edge component such as the edge component 320 may be connected to a SeGW 302 and multiple HeNBs and/or HNBs 306a, 306b. The edge component 320 may resolve an identifier of a SeGW such as SeGW ID using a list. The edge component 320 (e.g., upon the resolution) may connect to the SeGW 302, may establish an IP Sec tunnel 312b, and may establish an SCTP association 314b with the MME 330. As shown in FIG. 12, multiple HeNBs and/or HNBs 306a, 306b may resolve an identifier of an edge component such as CGW ID using a list. The HeNBs and/or HNBs 306a, 306b may connect to the edge component 320, may establish an IP Sec tunnel 312a, 312f, and may establish an SCTP association 314a, 314f with the edge component 320. A HeNB may establish a S1-AP association (e.g., 315a, 315d) with the MME 330. The S1-AP messages may pass through the edge component 320, using the SCTP associations 312a, 312f between the HeNBs 306a, 306b and edge component 320 and the SCTP association 312b between the edge component 320 and MME 330. A device such as the device 360 may attach to the core network (e.g., 300) through one or more of the HeNBs and/or HNBs 306a, 306b and the edge component 320. In an example, as part of the attach procedure, the device 360 may be given a default bearer context. As part of the attach procedure GTP tunnels 316a, 316f, and/or 316g may be established that may include HeNB-edge component and edge component-SGW.

A HeNB and/or HNB such as the HeNB and/or HNB 306b or HeNB 2 may fail. For example, as described herein, multiple HeNBs and/or HNBs may be connected to the edge component 320. A subset of the HeNBs and/or HNBs such as HeNB 2 or HeNB 306b may fail. The edge component 320 may not be able to reset the IP Sec tunnel 312b with the SeGW 302 to inform the network elements that the HeNB and/or HNB 302b may have failed as there may be other HeNBs and/or HNBs such as HeNB and/or HNB 306a that may be connected through the edge component 320 that may still be functional.

In an example, DPD in or associated with the edge component 320 may detect an IPSec failure (e.g., when the IPSec tunnel 312f may no longer be established to connect the edge component 320 to the HeNB 306b). In such an example, the SCTP association 314f may time out such that there may not be heartbeat messages or acknowledgements thereof at or received by the edge component 320 (e.g., from the HeNB 302b). Since the MME 330 may not know about the HeNB 306a failure, the S1-AP association 315d through the SCTP 314f and/or 314b may not be torn down (e.g., initially). The GTP association 316f between the edge component 320 and the HeNB 306a may be torn down (e.g., as shown in FIG. 13). The GTP association 316b between the edge component 320 and SGW 340 may remain. The GTP associated 316g between the edge component 320 and SGW 340 may be torn down at the same time as 316f and/or at a different time such as after 316f.

In an example, the MME 330 may be informed of the failure (e.g., such that the MME 330 may perform a procedure to clean up S1 associations, and/or the like). For example, the edge component 320 may send a S1-AP reset message to the MME 330 for the failed HeNB 302b. This may induce the MME 330 to clean up the S1 context for this HeNB 306b. The reset message may have the S1 context related to the HeNB 306b so that the MME 330 may remove the S1 context for this device. In an example, the S1-AP reset may allow and/or enable the edge component 320 to inform the MME 330 of the HeNB such as the HeNB 306b which may have failed without impacting another HeNB association such as the HeNB 306a and association 314a with the MME 330.

For example, as shown in FIG. 13, the S1-AP 315d for the HeNB 306b (e.g., in the SCTP 314b) may be torn down and/or removed in response to such a message. As described above, the IPSec tunnel 312f may be torn down by the edge component 320 (e.g., in response to the heartbeat messages along with the GTP tunnel 316f and/or the GTP tunnel 316g. However, the S1-AP may remain until the MME 330 may be informed of the failure and may be removed or torn down by the MME 330 after being informed as shown in FIG. 13.

A signaling interface between the MME 330 and edge component 320 may also be used. Over this signaling interface, the edge component 320 may inform the MME 330 that the HeNB 306b may have failed. After receiving this signal, the MME 330 may clean up the S1-AP session 315b with that HeNB and may attempt to reconnect the S1-AP session to the HeNB (e.g., if and/or when the HeNB may back online). This may be used in place of having the edge component 320 send a S1-AP reset message to the MME 330 for the failed HeNB 306b.

Figure 14:
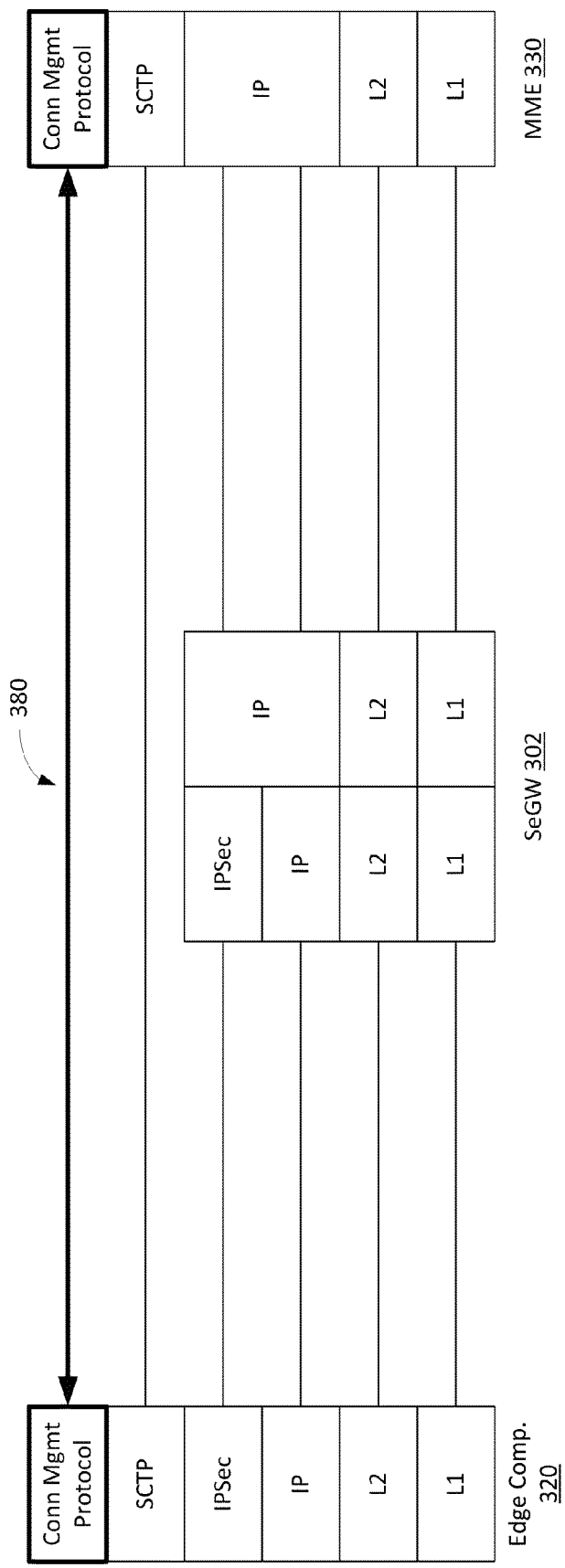
FIG. 14 depicts an example connection management interface (CMI) and the protocol layers thereof.

In an example, the signaling interface may be a CMI shown in FIG. 14 that may be between the edge component 320 and MME 330. FIG. 14 illustrates a CMI 380 and protocol levels associated therewith. The CMI 380 may be encapsulated in the SCTP session 314b between the edge component 320 and MME 330. Over the interface (e.g., 380), the edge component 320 and MME 330 may engage in a discovery and authentication procedures (e.g., 420 and 422 shown in FIG. 15) so that both the MME 330 and edge component 320 may find each other and know that each may be a trusted entity. In an example, since there may be an IPSec connection 312b between the edge component 320 and SeGW 302 and the edge component 320 and MME 330 knows about each other's presence, the discovery and authentication procedures may be incorporated in the initial connection between the edge component 320 and the SeGW 302 and MME 330.

Figure 15:
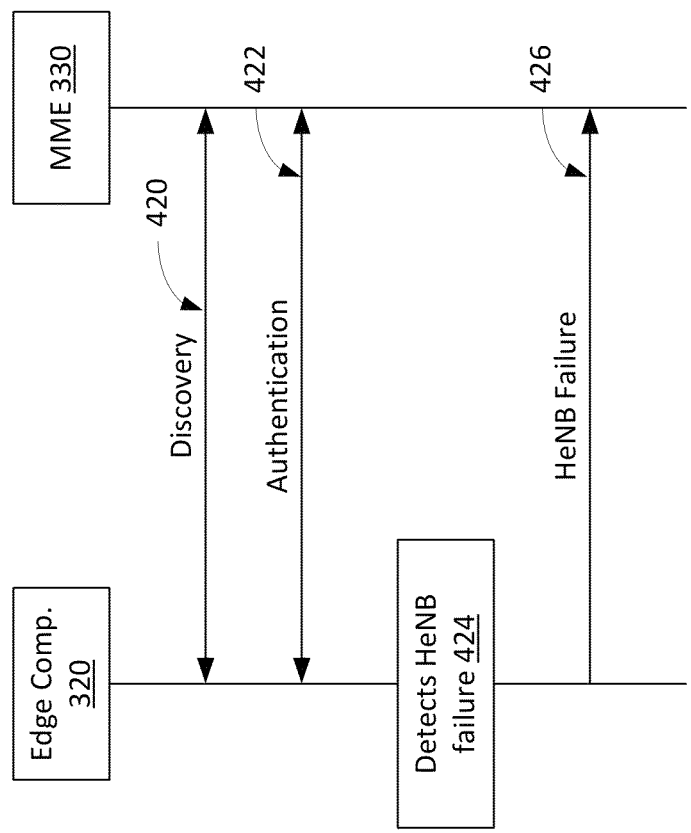
FIG. 15 depicts an example method and/or messages for informing a MME of a HeNB and/or HNB failure using a CMI (e.g., the CMI of FIG. 14).

After these procedures, upon the failure of a HeNB such as the HeNB 302b at 424, the edge component 320 may issue and send a HeNB failure message to the MME 330 as shown in FIG. 15 at 426. The HeNB failure message may include one or more fields such as a message type that may be used to identify the message as such a reset message, a MME identity that may be used to identify (e.g., uniquely) the MME such as MME 330 to the HeNB, a reset cause that may be used to indicate what the failure may have been at the SeGW, a nonce that may be used to prevent or reduce a replay attack by a malicious entity, and/or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method for handling a failure of a secure gateway (SeGW), the method comprising:
  establishing, with an edge component, a first connection to a first SeGW in a core network and a second connection to a home eNode-B (HeNB) in a local home network, the HeNB being connected to one or more components in the core network via the first and second connections established with the first SeGW and the edge component;

determining, at the edge component, whether the first SeGW has failed;

establishing, at the edge component, a third connection to a second SeGW in response to determining that the first SeGW has failed; and informing the HeNB using the second connection with the edge component that the first SeGW has failed in order to enable the HeNB to reconnect to the one or more components in the core network via the second connection or another connection established with the edge component and the third connection established with the second SeGW.

2. The method of claim 1, wherein establishing, with the edge component, the first connection to the first SeGW in the core network comprises:

resolving an identifier of the first SeGW from a list of devices;

establishing an Internet Protocol (IP) security tunnel between the edge component and the first SeGW; and establishing a stream control transmission protocol (SCTP) association between the one or more components of the core network and the edge component via the SeGW.

3. The method of claim 2, wherein determining, at the edge component, whether the first SeGW has failed comprises detecting a failure of the IP security tunnel between the edge component and the first SeGW using dead peer detection (DPD).

4. The method of claim 3, wherein DPD detects whether SCTP association has timed out via a heartbeat message not being received to detect the failure of the IP security tunnel between the edge component and the first SeGW.

5. The method of claim 2, wherein establishing, with the edge component, the second connection to the HeNB in the local home network comprises:

resolving an identifier of the edge component from a list of devices;

establishing an IP security tunnel between the edge component and the HeNB; and establishing a SCTP association with between the edge component and the HeNB.

6. The method of claim 5, further comprising establishing a S1-AP association with the one or more component of the core network using the SCTP association between the HeNB and the edge component and another SCTP association between the edge component and the one or more components of the core network via the first SeGW.

7. The method of claim 1, wherein informing the HeNB that the first SeGW has failed comprises tearing down an IP security tunnel established via the second connection to the HeNB.

8. The method of claim 1, wherein informing the HeNB that the first SeGW has failed comprises transmitting an S1-AP reset message to the HeNB indicating to the HeNB to restart an S1-AP interface.

9. The method of claim 1, wherein informing the HeNB that the first SeGW has failed comprises transmitting a message via SCTP over a connection management interface (CMI).

10. The method of claim 1, wherein informing the HeNB that the first SeGW has failed comprises transmitting a message via an X2 interface.

11. The method of claim 1, wherein informing the HeNB that the first SeGW has failed comprises transmitting a message via an Sxx interface.

12. The method of claim 1, further comprising establishing a first GTP tunnel between the HeNB and the edge component and a second GTP tunnel between the edge component and the one or more components of the core network.

13. A method for handling a failure of a home node-B (HNB), the method comprising:

establishing, with an edge component, a first connection to a secure gateway (SeGW) in a core network and a second connection to the HNB in a local home network, the HNB being connected to a mobility management entity (MME) in the core network via the first and second connections established with the SeGW and the edge component;

determining, at the edge component, that the HNB has failed; and informing the MME in the core network using the first connection with the edge component and the SeGW that the HNB has failed in order to enable the MME to remove information associated with the HNB that has failed.

14. The method of claim 13, wherein establishing, with the edge component, the first connection to the SeGW in the core network comprises:

resolving an identifier of the SeGW from a list of devices;

establishing an Internet Protocol (IP) security tunnel between the edge component and the SeGW; and establishing a stream control transmission protocol (SCTP) association with the MME of the core network and the edge component via the SeGW.

15. The method of claim 14, wherein establishing, with the edge component, the second connection to the HNB in the local home network comprises:

resolving an identifier of the edge component from a list of devices;

establishing an IP security tunnel between the edge component and the HNB; and establishing a SCTP association between the HNB and the edge component.

16. The method of claim 15, further comprising establishing a S1-AP association with the MME of the core network using the SCTP association between the HNB and the edge component and another SCTP association between the edge component and the MME of the core network via the SeGW.

17. The method of claim 16, wherein the information comprises S1 context information associated with the S1-AP association.

18. The method of claim 16, wherein determining, at the edge component, whether the HNB has failed comprises detecting a failure of the IP security tunnel between the edge component and the HNB using dead peer detection (DPD).

19. The method of claim 18, wherein DPD detects whether SCTP association has timed out via a heartbeat message not being received to detect the failure of the IP security tunnel between the edge component and the HNB.

20. The method of claim 19, wherein the IP security tunnel established via the second connection to the HNB is torn down by the edge component in response to the heartbeat message not being received by the edge component from the HNB.

21. The method of claim 20, wherein informing the MME that the HNB has failed comprises transmitting a S1-AP reset message to the MME via the SeGW.

22. The method of claim 20, wherein informing the MME that the HNB has failed comprises transmitting a message to the MME over a connection management interface (CMI) instructing the MME to clean up an S1-AP session with the HNB.

23. An edge component for handling a failure of at least one of a secure gateway (SeGW) or a home node-B (HNB), the edge component comprising a processor configured to:
   establish, with the edge component, a first connection to the SeGW in a core network and a second connection to the HNB in a local home network, the HNB being connected to at least a mobility management entity (MME) in the core network via the first and second connections with the SeGW and the edge component;
   determine whether at least one of the SeGW or HNB has failed;
   in response to determining that the SeGW has failed:
      establish, at the edge component, a third connection to another SeGW;
      inform the HNB using the second connection with the edge component that the SeGW has failed in order to enable the HNB to reconnect to the MME in the core network via the second connection or another connection established with the edge component and the third connection with the another SeGW; and
   in response to determining that the HNB has failed:
      inform the MME in the core network using the first connection with the edge component and the SeGW that the HNB has failed in order to enable the MME to remove information associated with the HNB that has failed.

24. The edge component of claim 23, wherein the processor is configured to determine, whether the SeGW has failed by detecting a failure of an Internet Protocol (IP) security tunnel between the edge component and the SeGW using dead peer detection (DPD).

25. The edge component of claim 24, wherein the processor is configured to inform the HNB that the SeGW has failed by tearing down an IP security tunnel established via the second connection to the HeNB.

26. The edge component of claim 24, wherein the processor is configured to inform the HNB that the SeGW has failed by transmitting a reset message to the HNB indicating to the HNB to restart an S1-AP interface.

27. The edge component of claim 24, wherein the processor is configured to inform the HNB that the SeGW has failed by transmitting a message via SCTP over a connection management interface (CMI).

28. The edge component of claim 24, wherein the processor is configured to inform the HNB that the SeGW has failed by transmitting a message via an X2 interface.

29. The edge component of claim 24, wherein the processor is configured to inform the HNB that the SeGW has failed by transmitting a message via an Sxx interface.

30. The edge component of claim 23, wherein the processor is configured to determine whether the HNB has failed by detecting a failure of an IP security tunnel between the edge component and the HNB using dead peer detection (DPD).

31. The edge component of claim 30, wherein the processor is configured to inform the MME that the HNB has failed by transmitting a S1-AP reset message to the MME via the SeGW.

32. The edge component of claim 30, wherein the processor is configured to inform the MME that the HNB has failed by transmitting a message to the MME over a connection management interface (CMI) instructing the MME to clean up an S1-AP session with the HNB.

* * * * *